(12) United States Patent  
Davidowitz et al.

(10) Patent No.: US 7,904,371 B2  
(45) Date of Patent: Mar. 8, 2011

(54) METHOD AND SYSTEM FOR INITIATING PAIRS TRADING ACROSS MULTIPLE MARKETS HAVING AUTOMATIC FOREIGN EXCHANGE PRICE HEDGE

(75) Inventors: James P. Davidowitz, New York, NY (US); Patrick Burke, New York, NY (US); Linda Mok, New York, NY (US); Victor Osinaga, New York, NY (US); Kenneth Ngai, Forest Hills, NY (US); William Mercado, Cortlandt Manor, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1518 days.

(21) Appl. No.: 10/615,428

(22) Filed: Jul. 7, 2003

(65) Prior Publication Data

US 2004/0267655 A1    Dec. 30, 2004

Related U.S. Application Data

(60) Provisional application No. 60/483,487, filed on Jun. 27, 2003.

(51) Int. Cl.  
*G06Q 40/00* (2006.01)
(52) U.S. Cl. ............................ 705/37; 705/36 R; 705/35
(58) Field of Classification Search ............... 705/35–45  
See application file for complete search history.

(56) References Cited

U.S. PATENT DOCUMENTS

| | | | |
|---|---|---|---|
| 5,787,402 A * | 7/1998 | Potter et al. ..................... | 705/37 |
| 5,963,923 A * | 10/1999 | Garber ............................. | 705/37 |
| 6,321,212 B1 | 11/2001 | Lange | |
| 6,519,574 B1 * | 2/2003 | Wilton et al. ................... | 705/35 |
| 6,952,683 B1 * | 10/2005 | Gerhard ........................... | 705/37 |
| 7,024,387 B1 * | 4/2006 | Nieboer et al. ................. | 705/37 |
| 7,039,610 B2 * | 5/2006 | Morano et al. .................. | 705/37 |
| 7,171,386 B1 * | 1/2007 | Raykhman ....................... | 705/37 |
| 7,236,955 B2 * | 6/2007 | Sugahara ........................ | 705/37 |
| 7,243,083 B2 * | 7/2007 | Burns et al. ..................... | 705/37 |
| 7,249,086 B2 * | 7/2007 | Bloom et al. .................. | 705/37 |

(Continued)

OTHER PUBLICATIONS

"You can run but you can't hide"; Euromoney Magazine; Dec. 00, 1997 p. 58, 059 Document Type: Newsletter Publisher: Euromoney Electronic Publications.*

(Continued)

*Primary Examiner* — Alexander Kalinowski  
*Assistant Examiner* — Abhishek Vyas  
(74) *Attorney, Agent, or Firm* — Lowenstein Sandler PC

(57) ABSTRACT

Methods and systems for initiating trading, and more particularly, to pairs trading across multiple exchanges by allowing a trader to monitor, trade, and hedge related securities that span across various markets. In certain embodiments of the invention, one or more processors are configured to receive spread parameters pertaining to a relationship between two or more securities in one or more markets, receive and process market data relating to the two or more securities, determine whether the market data falls within the spread parameters, initiate a first order for a first security in the spread in a foreign currency, when the market data falls within the spread parameters, initiate a second order for a second security in the spread, when the market data falls within the spread parameters, whereby the second order is in conjunction with the first order at a selected ratio to reduce the risk of adverse price movements in the first security, and initiate an FX Order to offset foreign exchange exposure resulting from the first order.

18 Claims, 13 Drawing Sheets

U.S. PATENT DOCUMENTS

| | | | |
|---|---|---|---|
| 7,412,415 B2 * | 8/2008 | Waddell | 705/37 |
| 2002/0087454 A1 | 7/2002 | Calo et al. | |
| 2002/0087455 A1 * | 7/2002 | Tsagarakis et al. | 705/37 |
| 2002/0091624 A1 * | 7/2002 | Glodjo et al. | 705/37 |
| 2004/0143536 A1 * | 7/2004 | Haberle | 705/37 |

OTHER PUBLICATIONS

International Markets Opening New Worlds for Arbitrage; Szala, Ginger; Futures: The Magazine of Commodities & Options v15n11 pp. 64, 66 Nov. 1986 ISSN: 0746-2468 Journal Code: CMM.*

Pricing and hedging spread options; Author(s): Carmona, R.; Durrleman, V. Affiliation(s): Dept. of Oper. Res. & Financial Eng., Princeton Univ., NJ, USA Journal: SIAM Review, vol. 45, No. 4, pp. 627-685.*

Chapman, Peter. A Program Trading Weapons Race. Brokers and Vendors Launch More User Products and Services. Trading & Technology. Apr. 2004, pp. 62-68.

Trade Factory-Spread Trader. Spear, Leeds & Kellogg. [Online] [Retrieved on Jan. 6, 2004] Retrieved from the Internet: <URL:http://www.redi.com/spreadtrdr.html>.

ITG Pairs and Long/Short Trading Strategies. Contingent trading made easy. [Online][Retrieved on Jan. 6, 2004] Retrieved from the Internet:<URL:http:// www.itginc.com/products/quantex/qtx99-pairs.html> pp. 1-3.

ITG-Tools—QuantEX Electronic Trading Made Intelligent. [Online][Retrieved on Jan. 6, 2004] Retrieved from the Internet:<URL:http:// www.itginc.com/products/quantex/index.html> pp. 1-4.

ITG-Tools—ITG Platform. [Online] [Retrieved on Jan. 6, 2004] Retrieved from the Internet:<URL:http://www.itginc.com/platform/index.html> pp. 1-2.

ITG-Tools—ITG WebAccess. [Online] [Retrieved on Jan. 6, 2004] Retrieved from the Internet:<URL:http://www.itginc.com/wap/accessdesc.html> pp. 1-2.

ITG-Tools-ITG Portfolio Trading. A vital link between the ITG Trading Desk and our suite of advanced trading strategies. [Online] [Retrieved on Jan. 6, 2004] Retrieved from the Internet:<URL:http:// www.itginc.com/products/etradingdesk/portfolio_trading_more.html> pp. 1-2.

ITG-About ITG-FX Server. [Online] [Retrieved on Apr. 9, 2004] Retrieved from the Internet<URL:http://www.itginc.com/canada/products/fxserver/index.html> pp. 1-3.

International Search Report dated Nov. 3, 2003, in PCT/US2003/21099.

* cited by examiner

METHOD AND SYSTEM FOR INITIATING PAIRS TRADING ACROSS MULTIPLE MARKETS HAVING AUTOMATIC FOREIGN EXCHANGE PRICE HEDGE

CROSS-REFERENCE TO RELATED APPLICATIONS

This application claims priority to co-pending U.S. Provisional Application entitled METHOD AND SYSTEM FOR INITIATING PAIRS TRADING ACROSS MULTIPLE MARKETS HAVING AUTOMATIC FOREIGN EXCHANGE PRICE HEDGE, filed Jun. 27, 2003, assigned Ser. No. 60/483,487, the entire disclosure of which is incorporated herein by reference.

BACKGROUND OF THE INVENTION

1. Field of the Invention

Present invention relates generally to a method and system for initiating pairs trading, and more particularly, to initiate pairs trading across multiple markets, including foreign markets, and automatic foreign exchange price hedge.

2. Description of Related Art

Pairs trading is an investment strategy that, in its basic form, involves the purchase of one or more securities while simultaneously selling (or selling short) one or more other securities. A pairs trade often involves companies that are related or linked in some manner (for example, within the same industry) and attempts to limit market or sector exposure while emphasizing only the performance of one or more securities relative to one or more other securities. Conducted in the correct ratio, pairs trading removes general market risk, thereby leaving the investor "market neutral," while having the ability to capitalize on the relative strength of one or more securities relative to one or more other securities. Pairs trading may include investment strategies such as risk arbitrage, convertible arbitrage, bond arbitrage, comparative arbitrage, and the like and may include the trading of stocks, futures, options bonds, debt instruments, currencies, and the like.

Pairs trading is employed not only by individual investors, but also by investment fund managers and other investment professionals. Furthermore, such investors routinely diversify their portfolios by investing in pairs in a variety of markets or sectors. However, continually monitoring, managing, and trading multiple pairs strategies in several different markets can be a complex burden on an investor. Adding further complexity, market conditions are constantly changing, which makes it necessary for traders to alter strategies and equations used to determine whether a trade is desirable in the current market.

Further, with greater regularity, investors are entering into cross-border pairs transactions, each time buying or selling securities in a foreign currency. As such, entities often realize transactions in foreign currencies, and therefore, the accounting records of the entity potentially reflect positions in multiple currencies. Consequently, determining the aggregate value of the positions at any given instant is difficult. A similar problem exists when an entity first considers entering into a cross-border transaction. Often, an entity will have the option of entering into the same transaction, for example, the sale of a security, in any one of multiple currencies, thereby receiving bids in multiple currencies. Such option can be meaningless if the entity cannot translate each bid into a common currency. Moreover, when buying and selling securities in a foreign currency, the entity buying and selling the securities is exposed not only to typical market risks, but also to the additional risk associated with the exposure to the foreign currency.

Accordingly, a need exists for an automated system that can help manage an investor's portfolio, including continuously monitoring the relationships of pairs in various markets and automatically executing transactions based upon the realization of specific parameters chosen by the investor or the investor's agent. Additionally, a need exists for a dynamic system that will allow for an administrator to easily edit or update the system to reflect changing market conditions with minimal or no code revisions. Further, a need exists for a system that can monitor the relationships between securities in various foreign currencies and revalue such securities into a single currency in order to facilitate an investor's automated pairs trading strategy.

SUMMARY OF THE INVENTION

The foregoing, as well as other, needs are satisfied by the present invention. According to certain embodiments, methods and systems for initiating pairs trading are disclosed.

One embodiment of the invention directed to a system for initiating trading of a spread of two or more securities in one or more markets. This embodiment of the system includes one or more processors configured to: identify spread parameters pertaining to the securities; receive market data relating to the two or more securities of the spread; determine whether the market data falls within certain spread parameters, and if the market data falls within the certain spread parameters; initiate a first order for a first security of the spread in a foreign currency; initiate a second order for a second security of the spread, whereby second order is in conjunction with the first order at a selected ratio to reduce the risk of adverse price movements in the first security; and initiate an FX Order to offset foreign exchange exposure resulting from the first order.

Another embodiment of the invention is directed to a method of initiating trading of a spread of two or more securities in one or more markets. This embodiment of the method includes: identifying spread parameters pertaining to a relationship between the securities, receiving market data relating to the two or more securities; determining whether the market data falls within certain spread parameters; initiating a first order for a first security of the spread in a foreign currency, when the market data falls within the certain spread parameters; initiating a second order for a second security of the spread, whereby the second order and first order are at a selected ratio to reduce the risk of adverse price movements in the first security; and initiating an FX Order to offset foreign exchange exposure resulting from the first order.

Yet another embodiment of the invention is directed to a system for initiating trading. This embodiment of the system includes: a means for receiving spread parameters pertaining to a relationship between two or more securities in one or more markets; a means for processing market data relating to the two or more securities; a means for determining whether the market data falls within the spread parameters; a means for initiating a first order for a first security of the spread in a foreign currency, when the market data falls within one or more of the spread parameters; a means for generating a second order for a second security of the spread, when the market data falls within one or more of the spread parameters, whereby the second order and the first order at a selected ratio to reduce the risk of adverse price movements in the first security; and means for initiating an FX Order to offset foreign exchange exposure resulting from the first order.

Yet another embodiment of the invention is directed to a client-server system for initiating trading involving two or more securities. This embodiment of the system includes a user interface to allow a trader to input spread parameters pertaining to a relationship between two or more securities in one or more markets and transmit the spread parameters to the spread engine. This embodiment also includes a spread engine in communication with the user interface. The spread engine is configured to receive the spread parameters from the client station, receive market data relating to the two or more securities, and determine whether the market data falls within the spread parameters. This embodiment of the system additionally includes a server in communication with the spread engine. The server is configured to initiate two or more orders when the market data for the two or more securities falls within the spread parameters, wherein at least one of the two or more orders is for a security in a foreign currency, and wherein the server is configured to initiate an FX Order to offset foreign exchange exposure resulting from initiation of the order for the security in the foreign currency.

The invention will next be described in connection with certain exemplary embodiments; however, it should be clear to those skilled in the art that various modifications, additions, and subtractions can be made without departing from the spirit or scope of the claims.

BRIEF DESCRIPTION OF THE DRAWINGS

The following drawing figures, which are included herewith and form a part of this application, are intended to be illustrative examples and not limiting of the scope of the present invention.

FIGS. 6-11 illustrate exemplary graphical user interfaces on the client station according to various embodiments of the present invention.

DETAILED DESCRIPTION OF CERTAIN EMBODIMENTS

Certain embodiments of the present invention will now be described in greater detail with reference to the aforementioned figures.

Figure 1:
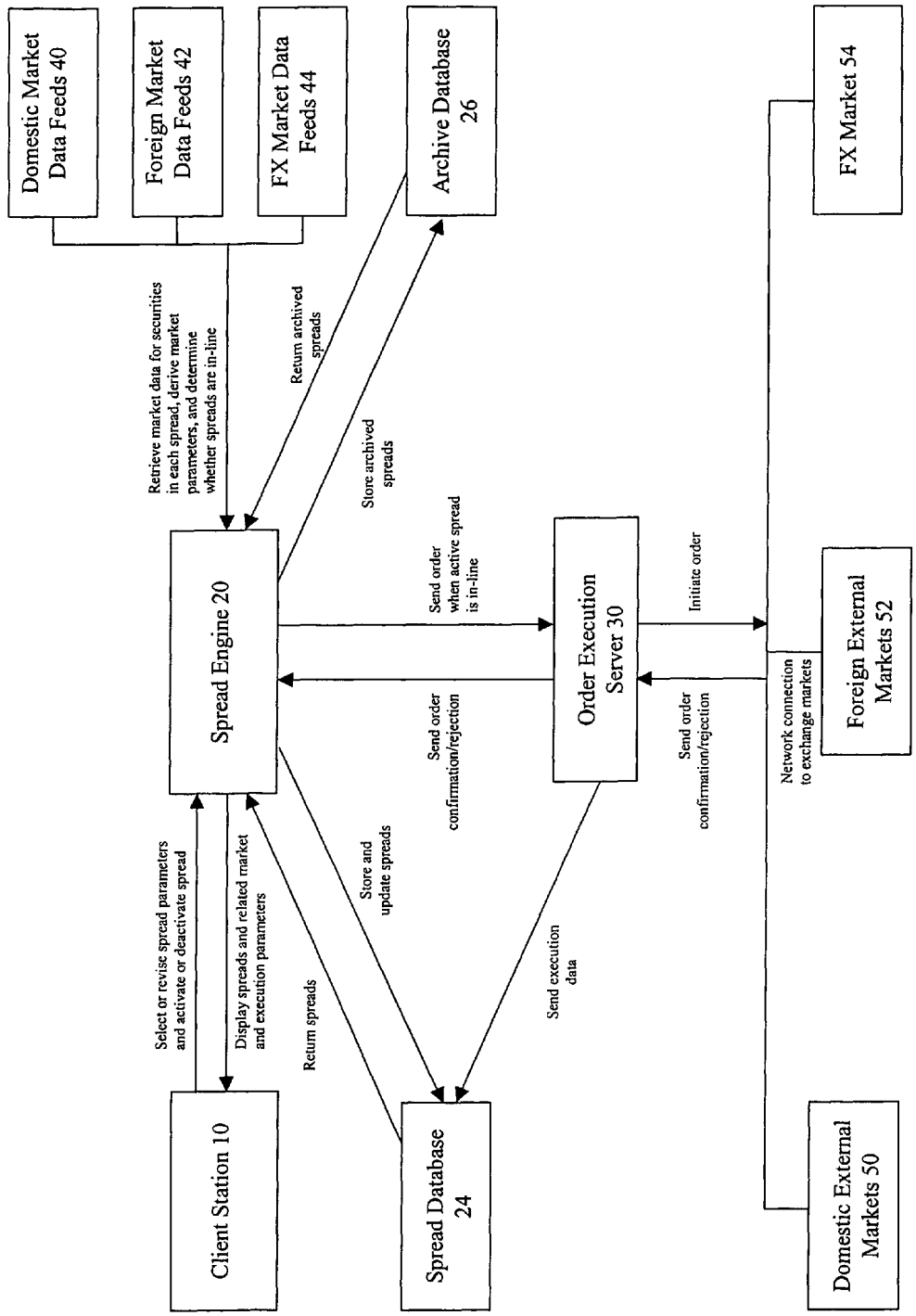
FIG. 1 is a workflow diagram illustrating components and the flow of data according to one embodiment of the present invention.

FIG. 1 is a workflow diagram illustrating the components and flow of data according to one embodiment of the present invention as will be described in greater detail below, this embodiment permits traders to set-up and monitor pairs trades or spreads, that are automatically triggered and initiated. The orders comprising each spread may be for domestic or foreign securities (as defined below). Traders also have the option of setting the system to automatically enter into foreign exchange transactions to remove foreign exchange price exposure from securities trades executed in foreign currencies.

More specifically, this embodiment of the invention includes: a client station 10, a spread engine 20, an order execution server 30, a spread database 24 and an archive database 26. In the present embodiment, the client station 10 is a computer workstation, or other processing device, such as a PDA, cell phone, and the like, coupled to the order execution server 30 via any of a number of networks, such as a local area network, wide area network, the Internet, wireless network, virtual private network and the like, utilizing essentially any type of communication protocol, such as Ethernet, IP addressing, http and the like. The spread engine 20 of the present embodiment is a software object or program running on a processor. In the present embodiment, the spread engine 20 is running on the client station 10, although in alternate embodiments it resides on the order execution server 30 or a separate computer coupled to the client station 10 and order execution server 30.

Furthermore, although only one of each component is illustrated, it is to be understood that multiple of any of the components may be utilized. For example, in alternate embodiments the system includes multiple client workstations coupled to one or more spread engines and/or order execution servers be one such embodiment having multiple client workstations in communication with the execution server via a network, the user of the workstations are external clients of the provider of the system.

As illustrated, in addition to being coupled to the client station 10 and order execution server 30, the spread engine 20 is coupled to both domestic and foreign market data feeds 40 and 42, as well as a foreign exchange currency feed 44 (collectively referred to herein as market data feeds 40). As illustrated, the order execution server 30, in turn, is coupled to the spread engine 20, the spread database 24, and any number of execution venues, such as ECNs, NASDAQ and other domestic and international markets 50 and 52, respectively, on which any security is traded, as well as one or more foreign exchange currency markets 54 (collectively referred to as external markets 50). Although referred to as "external" markets, it is to be understood that any of such markets may be internal to the provider of the system, for example, where the provider serves as principle, trading on its own account.

It also should be understood that the present invention may accommodate any number of market data feeds 40 and external markets 50. Furthermore, connections to the market data feeds 40 and external markets 50, whether direct or indirect, may be via any technology, including those noted above.

In general, the system allows traders or other investors to enter and track, via the client stations 10, pairs trades, or spreads, that the spread engine 20 and order execution server 30 automatically generate and send to the external markets 50 to be filled. Each spread includes orders for two or more securities. As used herein, a "security" is an ownership or creditorship interest, such as a stock certificate, bond, or any other financial instrument, contract or transaction, such as a forward, future, option, put, call, collar, swap, or currency contract on any security. This description uses the term "security" for convenience, but is should be understood that the term covers financial instruments generally. As described in greater detail below, one or more foreign FX Orders may be associated with a spread and automatically generated and sent to the foreign exchange market 54. Such foreign exchange transactions are particularly useful to automatically remove foreign exchange risk when transacting in securities in foreign markets and, thus, foreign currencies.

Furthermore, traders may enter, via the client stations 10, parameters that define not only the orders comprising the spread, but also the conditions upon which the spread engine 20 initiates generation of the orders of the spread. These parameters and conditions are referred to herein as spread parameters. The trader may enter a spread parameter which determines whether to simultaneously initiate market orders, referred to as "normal spreads," or whether to initiate one side of a spread by executing a limit order as the market approaches the requisite market conditions for the securities in the spread, referred to as "legging spreads." As will be appreciated, legging spreads may involve legging into either side of the spread (i.e., buy or sell).

More specifically, once a trader enters spread parameters, the spread is communicated to the spread engine 20 and stored or updated in the spread database 24. The spread engine 20 receives market data related to the securities in the spread from the market data feeds 40. Where the trader has chosen to use a normal spread calculation in the spread parameters, the spread engine 20 compares the relevant spread parameters with the market data to determine whether the requisite market conditions exist to initiate market orders for the securities in the spread. If the spread parameters are met, the spread engine 20 generates line orders for the securities in the spread and the line orders are displayed on the client station 10. Upon the trader confirming the line orders for the securities in the spread, the spread engine 20 signals the order execution server 30 to initiate market orders for the securities in the spread. In alternate embodiments, however, the order execution server 30 generates the market orders without trader confirmation. The order execution server 30, in turn, receives the market orders from the spread engine 20 and initiates the orders with the appropriate external market 50. Such orders include any foreign exchange transactions, which, in alternate embodiments, are initiated either automatically based on spread parameters or upon manual trader intervention. The order execution server 30 receives execution data relating to the status of the market order and sends this execution data to the spread database 24 to be stored and viewed by the trader at a client station 10.

In a further embodiment of the present invention, where the user has chosen, in the spread parameters, to use a legging spread calculation, the spread engine 20 compares the relevant spread parameters with the market data to determine whether the requisite market conditions exist to initiate a limit order for securities on one side of the spread, also as selected by the trader. If the spread parameters are met, the spread engine 20 generates line orders for the securities on one side of the spread and the line orders are displayed on the client station 10. Upon the trader confirming the line orders for the securities, the spread engine 20 signals the order execution server 30 to initiate the limit orders for the securities. In alternate embodiments, however, the order execution server 30 generates the limit orders without trader confirmation. The order execution server 30, in turn, receives the limit orders from the spread engine 20 and initiates the limit orders with the appropriate external market 50. The order execution server 30 receives execution data relating to the status of the order and sends this execution data to the spread database 24 to be stored and accessed by a client station 10 for viewing by a trader. The order execution also signals the spread engine to generate line orders for the securities on the other (i.e., market) side of the spread and the line orders are displayed on the client station 10. Upon the trader confirming the line orders for the securities, the spread engine 20 signals the order execution server 30 to initiate market orders for the securities on the other side of the spread. In alternate embodiments, however, the order execution server 30 generates the market orders without trader confirmation. The order execution server 30, in turn, receives the market orders from the spread engine 20 and initiates the orders with the appropriate external market 50. The order execution server 30 receives execution data relating to the status of the market order and sends this execution data to the spread database 24 to be stored and viewed by the trader at a client station 10.

The client station 10 has a graphical user interface that allows a trader to log on to his or her account in the system and to enter, view, and edit spreads and spread parameters, and to view certain market parameters and execution parameters, which will be described below. Exemplary spread parameters generally include data fields that are selected by the trader to determine the market conditions at which orders should be executed and parameters of such orders, including, for example, type of orders (buy/sell, long/short), quantity of shares to be traded, quantity of futures to be traded, number of options to exercise, and any other quantitative or qualitative measure or identifier of the securities. The trader may also enter a spread parameter which determines whether to use a normal spread calculation or a legging spread calculation. Additional exemplary spread parameters are described below.

In certain embodiments described below, spread parameters further include currency and foreign exchange information relating to the spread. In certain of such embodiments, the trader may enter spread parameters that determine the currency to which market data and execution data (e.g., for foreign securities) should be converted, evaluated, and/or displayed. Moreover, regardless of whether normal or legged spreads are employed, each trader may, via a client workstation 10, enter parameters for any spread that specify whether, the system should automatically generate a foreign exchange order to remove foreign exchange price exposure and into what currency any such exposure should be converted.

The spread engine 20 receives new or revised spreads from the trader at the client station 10 and stores the spreads in the spread database 24. The spread engine 20 also stores spreads that have been deleted by the trader in the archive database 26 for later retrieval, for example, in the instance where the trader wishes to recall and activate a spread that was previously entered.

As noted above, the spread engine 20 also accesses and receives market data via connections to the market data feeds 40. In the present embodiment, the spread engine 20 continuously receives real-time and delayed market data (when available), including general market information, as well as information relating to each security contained in each spread stored in the spread database 24. Information from the foreign currency data feed 44 includes currency information, including actual and/or indicative exchange rates. As will be appreciated by those skilled in the art, the present system may be a client of the price provider described in copending application Ser. No. 10/081,460, entitled METHOD AND SYSTEM FOR PROVIDING FOREIGN EXCHANGE PRICE INFORMATION AND HEDGE, filed on Feb. 21, 2002 (the "'460 application"), the entire disclosure of which is hereby incorporated by reference, and, as such, the system of the '460 application may serve as the foreign exchange data feed 44 of the embodiments described herein. Alternatively, the FX rate providers of the '460 application may serve as the data feed 44.

In connection with determining whether to initiate spread orders, the spread engine 20 derives market parameters from the market data. Market parameters include market data and data based on market data that is displayed to the trader, used to determine whether to initiate spread orders, or to process rules and rule checks. For example, market parameters include for example, current buy/sell prices for securities, current spreads for two or more securities, currency exchange rates, and any other information to be used in determining whether or how to initiate an order or display to the trader. Further exemplary market parameters are described below. Where market data is received from a market data feed 40 and the trader wishes to view the data in a currency other than that as received from the market data feed 40, the spread engine 20 continuously converts the market data to the currency selected by the trader in the spread parameters for the corresponding spread, utilizing the current foreign exchange rate received from market data feed 44, and then derives the market parameters in the currency selected by the trader in the spread parameters.

As described in greater detail below, where the trader has chosen to use a normal spread calculation, the spread engine 20 compares the spread parameters selected by the trader for each spread with the market parameters for the securities in each such spread or the market data itself, as appropriate, to determine whether the requisite conditions exist to initiate market orders for the securities in each such spread. The spread engine 20 generates a line order for each security in the spread, where the requisite conditions exist. The spread engine 20 displays the line orders on the trader's client station 10. The spread engine 20 signals the order execution server 30 to initiate market orders where the trader has confirmed the line orders. The spread engine 20 stores execution data relating to the initiation of the market order in the spread database 24, such as the order quantity, number of shares that have been filled, and the like.

Where the trader has chosen to use the legging spread calculation, whether initiating the spread on the buy or sell side, the spread engine 20 compares the spread parameters selected by the trader for each spread with the market parameters for the securities in each such spread or the market data itself, as appropriate, to determine whether the requisite conditions exist to initiate limit orders for the securities on one side of the spread. The spread engine 20 generates a line order for the securities on one side of the spread, where the requisite conditions exist. The spread engine 20 displays the line orders on the trader's client station 10. The spread engine 20 signals the order execution server 30 to initiate limit orders where the trader has confirmed the line orders. The spread engine 20 stores execution data relating to the initiation of the limit order in the spread database 24. Upon receiving confirmation from the order execution server 30, that the limit orders have been filled, the spread engine 20 generates a line order for the securities on the other side of the spread. The spread engine 20 displays the line orders on the trader's client station 10. The spread engine 20 signals the order execution server 30 to initiate market orders where the trader has confirmed the line orders. The spread engine 20 stores execution data relating to the initiation of the market orders in the spread database 24.

The spread engine 20 also derives execution parameters from execution data stored in the spread database 24, which reflect the status and details of orders for the securities in the trader's spreads, as well as the status and details of foreign exchange transactions. For example, when a market order is partially filled, the order execution server 30 receives execution data specifying the number of shares in the order that have been filled and the price(s) of the fills. This execution data is sent to the spread database 24. When the trader wishes to view the number of remaining shares in an order not yet filled (referred to in the trading vernacular as "leaves"), the spread engine 20 accesses the execution data for the market order in the spread database 24, derives the number of leaves for an order by subtracting the number of shares that have been filled in the order from the total shares initiated for the order, and displays this execution parameter to the client station 10. As described herein, execution parameters further include information describing line orders and foreign exchange orders not yet sent to the markets 50 for execution, such as, for example, price, size, type of order (buy/sell; market/limit; short/long), time of generation, spread limit at generation and the like.

The order execution server 30 receives market orders from the spread engine 20 in response to the trader confirming a line order generated by the spread engine 20. The order execution server 30, in turn, publishes the market orders to a plurality of gateways. Each gateway is a software application running on the order execution server 30 that is coupled to one or more external markets 50 via a point-to-point connection, a fixed trading network or other communication link, such as that provided by Reuters Group, plc, Bloomberg LP, IFX (a subsidiary of Zettters Group, plc), Thompson Financial (under the tradename TRADEROUTE), and the like. While a market order is published to all gateways, only the gateway coupled to the appropriate external market 50 for the security specified in the market order recognizes the market order and initiates the market order with the external market 50 coupled thereto. The order execution server 30 receives execution data relating to the status of the orders from the external markets 50, via the gateway, and sends this execution data to be stored in the spread database 24. For example, when an order for a security is filled by an external market 50, the order execution server 30 receives a confirmation record from the external market 50 and updates the spread database 24 based on the record. When an order is unable to be filled by the external market 50, the order execution server 30 sends a rejection record to the spread engine 20 and notifies the trader via the graphical user interface. Similarly, if the order execution server 30 does not receive a confirmation from the appropriate external market 50, in a certain amount of time, for example fifteen seconds, the order execution server 30 notifies the spread engine 20 and trader, updates the database, and causes the order to be withdrawn. In alternate embodiments, the gateways coupled to the order execution server 30 may run on one or more servers.

Where the trader has chosen to use the legging spread calculation, the order execution server 30 receives limit orders from the spread engine 20 in response to the trader confirming a line order generated by the spread engine 20. The order execution server 30, in turn, publishes the limit orders to the plurality of gateways. The gateway(s) coupled to the appropriate external market(s) 50 for the security(ies) specified in the limit order(s) recognizes the limit order(s) and initiates the limit order(s) with the external market(s) 50 coupled thereto. The order execution server 30 receives execution data relating to the status of the limit orders and sends this execution data to be stored in the spread database 24. When the order execution server 30 receives confirmation that the limit orders have been filled, the order execution server 30 signals the spread engine 20 to initiate line orders for the securities on the other side of the spread. The order execution server 30 then receives market orders from the spread engine 20 in response to the trader confirming a line order generated by the spread engine 20. The order execution server 30, in turn, publishes the market orders to a plurality of gateways. The gateway coupled to the appropriate external market 50 for the security specified in the market order recognizes the market order and initiates the market order with the external market 50 coupled thereto. The order execution server 30 receives execution data relating to the status of the market orders and sends this execution data to be stored in the spread database 24.

As noted above, in the present embodiment, the spread engine 20 and the order execution server 30 include functionality (for example, embodied in one or more software applications, routines or objects) for entering into foreign exchange (FX) transactions (such functionality being referred to herein as "FX Trader"). In alternative embodiments, FX Trader is implemented on one or more separate processors coupled to the spread engine 20 essentially placing the price provider system of the aforementioned application in communication with the spread engine 20. Thus, while FX Trader of the present embodiment utilizes the market data feed 44 and external market 54 coupled to the present system, in alternate embodiments, FX Trader utilizes separate market data feeds and markets that replace those of the current embodiment.

Based on a trader's parameters, FX Trader may convert the market data to the currency selected by the trader in the spread parameters for the corresponding spread. The spread engine 20 then derives market parameters from the market data in the currency selected by the trader in the spread parameters for the corresponding spread. The spread engine 20 compares the spread parameters selected by the trader for each spread with the market parameters for the securities in each such spread to determine whether the requisite conditions exist to initiate market or limit orders for the securities in each such spread.

The present embodiment also utilizes FX Trader, in conjunction with the foregoing spread engine 20 and order execution server 30 functionality, to initiate currency transactions, or "FX orders", to be sent to the external FX markets 54. As will be appreciated by those skilled in the art, such external market 54 make take the form of the price provider disclosed in the '460 application. As described below, the trader may select, as a spread parameter, to utilize FX Trader to hedge their exposure in the local foreign currency when initiating orders for securities in foreign markets, by simultaneously entering into a currency exchange for equivalent value, which in effect realizes the transaction in the trader's desired currency. By way of example, a trader entering into an equity transaction on the Canadian Stock Exchange may enter into that transaction paying in Canadian dollars, while removing the foreign exchange exposure component to that transaction by simultaneously entering into a U.S. dollar/Canadian dollar currency exchange of an equal value. In the foreign exchange trading vernacular, the trader would have "flattened out" the foreign exchange exposure resulting from the cross-border securities transaction. Such foreign exchange transaction may be initiated at any time, including simultaneously with a security order or before or after the security order or orders (or a portion thereof) have been filled.

The spread engine 20, using the FX Trader functionality, also converts execution data for orders in foreign markets received from the order execution server 30 to the currency selected by the trader in the spread parameters for the corresponding spread. In so doing, the spread engine 20 utilizes the current exchange rate, the exchange rate at the time that the order was initiated, or the exchange rate at any other time, depending upon the execution parameter, as provided by the FX market data feed 44.

As noted above, in providing the foregoing functionality, the system stores certain information in memory, such as spread database 24. An exemplary spread database 24 will now be described in greater detail. As an initial matter, it should be noted that the spread database 24 of the present embodiment is merely an illustrative logical arrangement of exemplary data, as more or less data may be stored in different embodiments and such data may be arranged in fewer or more tables. Furthermore, rather than include a field in a table to represent certain information, the information could also be represented by setting certain flags associated with the record. Additionally, certain descriptors in the tables represent one or more separate fields of information and are used simply for convenience.

The spread database 24 includes a trader identification table, which contains account identifying information for each trader entitled to use the system, such as traders, trading desks comprising a plurality of traders, or outside customers. Exemplary account identifying information includes: a trader name, a trader password, a client identification (ID) code, account IDs and the like. Each trader may also be associated with a trading desk or department, as identified in the database 24.

The spread database 24 also includes a spread table, which contains the spreads, as identified by spread IDs, for each trader's account and execution data corresponding to each such spread. Each time a trader enters spread data for a new spread or edits the spread data for an existing spread, via the client station 10, the spread engine 20 processes the spread, and the new or revised spread is stored in the spread table of the spread database 24. Each time an order is initiated by the order execution server 30, the order execution server 30 (or the spread engine 20 in alternate embodiments) stores the execution data corresponding to those orders in the spread database 24. A trader may view the spreads and corresponding execution data in their account by logging on to the system via the client station 10. Periodically, the spreads and corresponding execution data stored in the spread database 24 will be archived by deleting the spreads and corresponding execution data from the spread database 24 and adding such spreads and corresponding execution data to the archive database 26. In certain embodiments, the trader may determine the proper time for a spread to be archived, for example, at the end of a business day, at the end of a business week, and the like.

For each spread that has been stored in the spread table, there are associated flags indicating which rules and rule checks have been selected in the spread parameters by the trader (or set by the administrator or system provider), are to be performed in determining whether a spread is "in-line" and whether orders should be initiated for the securities in the spread and if so, certain terms of the orders. A spread is considered to be "in-line" when the current market parameters fall within the spread parameters entered by the trader to automatically generate a line order for the securities in that spread. In general, rule checks are mathematical equations, or other algorithms, used to determine additional requisite conditions that must be present in order for the spread engine 20 to automatically generate line orders for the securities in a spread. In the present embodiment, the algorithms or mathematical equations for the "in-line" rules and rule checks are coded in the spread engine 20.

In alternate embodiments, the spread database 24 includes a rules table to store the rules and rule checks. The rules table associates one or more rule IDs and rule check IDs with each spread ID. Separate tables store the details corresponding to each rule ID and rule check ID, respectively. Such details include, for example, an indication of the relevant parameters and data, data operations performed on such parameters and data (e.g., equal to, less than, greater than, and, or, not, nor, nand and the like and any combination thereof) and the order of performing such operations on the parameters and data in each rule and rule check, respectively. As such, applying a different rule and/or rule check to a spread is simply a matter of specifying a different rule ID and/or rule check ID, as appropriate, for each spread. Furthermore, adding a completely new rule or rule check is simply a matter of assigning a new ID and creating a new record in the rules table, as appropriate. The in-line rule equation and rule checks are stored in the spread database 24 to allow an administrator to easily revise or update the system to reflect changing market conditions with minimal or no changes to the programming code any of the application software for the system. An administrator has special access to the spread database 24 to choose or revise the in-line rule equation and rule checks. In certain embodiments, the trader may select which of one or more in-line rule equations and rule checks to apply to each spread. In other embodiments, the one or more in-line rule equations and/or rule checks are coded on the software running on each individual client station 10 that is connected to the system via network, and the in-line equations and rule checks may be personalized for each individual trader.

The spread database 24 also includes a line order table. For each spread that has been stored in the spread table, that has been determined to be in-line, there is associated one or more line orders stored in the line order table. Each line order may be for an equity transaction or an equity transaction with an associated foreign exchange transaction. Each record identifies the line order, including by type (buy/sell; market/limit); security/currency; size; price and the like.

The spread database 24 includes an order table. For each line order that has been confirmed by a trader and thus sent to the external markets 50, there is associated one or more orders stored in the order table. Each record identifies the order, including by type (buy/sell, long/short, market/limit); security/currency; size; price and the like. Each record also includes an identification as to status (e.g., open, filled, partially filled, and the like).

The spread database 24 includes a trade execution table. For each order that has been sent to the external markets 50 and executed for a trader, there is associated execution data stored in the trade execution table. Such execution data may include size; price; time; market; trade ticket/confirmation number and the like. There may be multiple records of execution data for each order, such as when an order is filled in stages.

In certain embodiments, the spread database includes various other tables, includes these for aggregately each trader's positions, open orders, and foreign exchange exposure, as well as for aggregating multiple trader's positions (for example, all traders on a given desk or trading on a given book), open orders and foreign exchange exposure. The database 24 may also include tables, storing regulatory information, including those referred to as an OATS table. For each order sent to the external markets 50, the table stores a flag indicating whether the order was an agency, proprietary, or broker order, and other information regarding the orders and type of orders initiated for the current day or other period as may be required to submit to an external market, such as NASDAQ. At the end of each day this table may be cleared and the records transferred to the archive database 26.

The archive database 26 will now be described in greater detail. As an initial matter, it should be noted that the archive database 26 of the present embodiment is merely an illustrative logical arrangement of exemplary data, as more or less data may be stored in different embodiments and such data may be arranged in fewer or more tables. Furthermore, rather than include a field in a table to represent certain information, the information could also be represented by setting certain flags associated with the record. Additionally, certain descriptors in the tables represent one or more separate fields of information and are used simply for convenience.

The archive database 26 includes an archive table, which contains the spreads, as identified by a spread ID, for each trader's account that have been archived and the execution parameters corresponding to each such spread. A trader may recall and view a spread in their account that has previously been archived and stored in the archive database 26.

Figure 2:
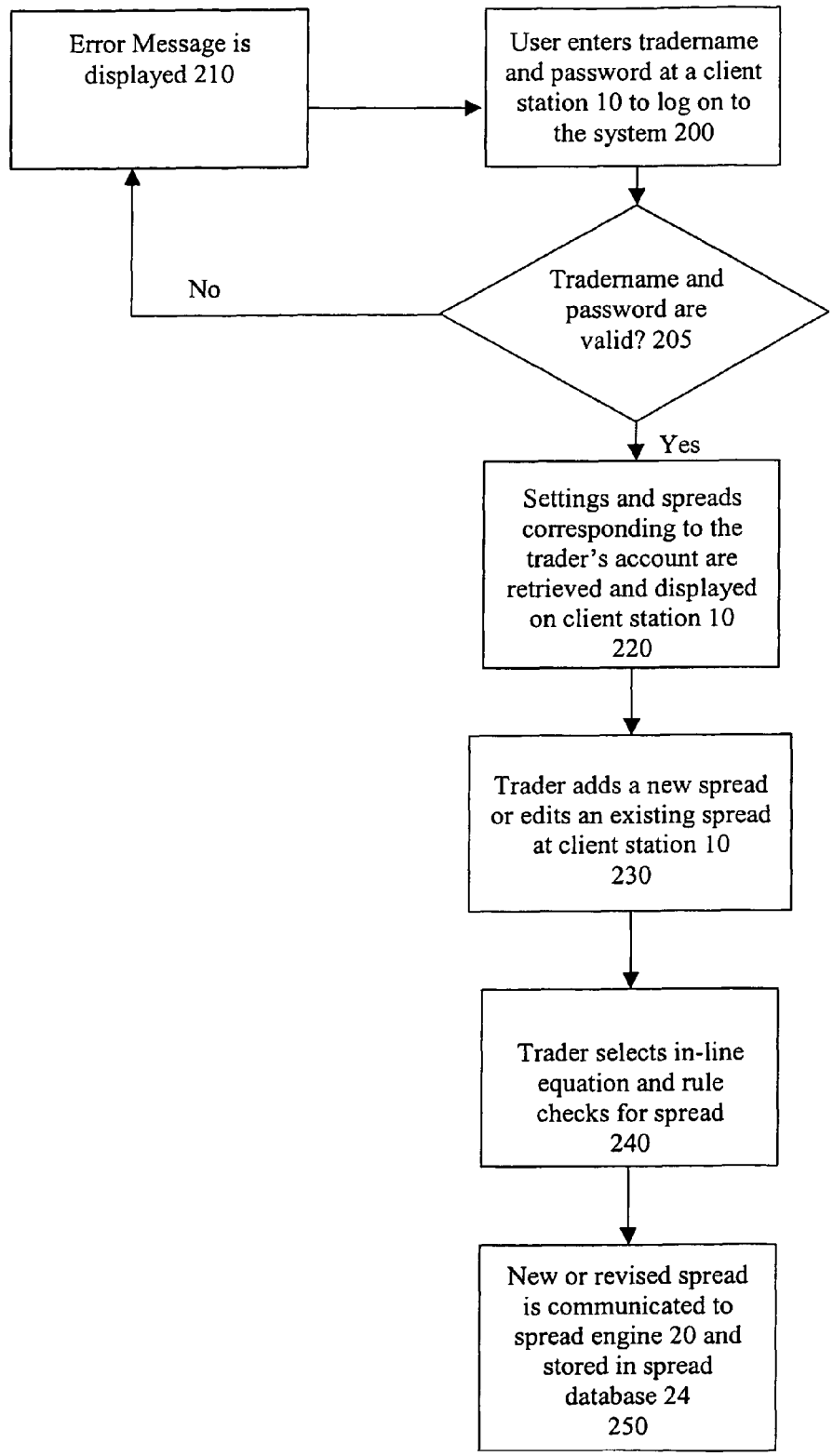
FIG. 2 is a flow chart illustrating the process of trader log-in and spread entry according to one embodiment of the present invention.

Having described the components and general operation of the system, the operation of the system will now be described in greater detail. The process for trader log-in and spread entry according to one embodiment of the present invention will now be described with reference to FIG. 2.

In step 200, the trader enters a tradername and password at a client station 10 to log on to the system. In step 205, the tradername and password are checked against the spread database 24 to determine whether the trader has entered a valid tradername and password. If the trader fails to enter a valid tradername and password combination, an error message is displayed, in step 210, and the log-on dialog box remains on the screen with the password field cleared and the previously entered tradername in the tradername field. If the trader is already logged on (as determined, for example, by a flag associated with the tradername in the database 24 being set), the trader will be notified that only one log-on per trader is allowed. The trader will have the option for closing (logging out) the previous session or canceling the new session. A cancel button may also be displayed on the log-in screen so that traders can exit without logging on. The trader is automatically logged off when exiting the system. If the tradername and password are valid, the settings and current spreads corresponding to the trader's account are retrieved from the spread database 24 and displayed on the graphical user interface (GUI) on the trader's client station 10, as shown in step 220. An exemplary GUI is shown in FIGS. 6-11 and will be described below. The trader may also recover the spreads that have been stored in the archive database 26 corresponding to that particular trader's account by choosing an option at the trader's client station 10.

In step 230, the trader may add a new spread by selecting one or more Buy Securities and one or more Sell Securities and entering the spread parameters for the spread, or the trader may edit an existing spread by revising the selected securities and spread parameters for the spread, via the graphical user interface at the trader's client station 10. In step 240, the trader may than select or unselect the one or more in-line equations and rule checks that are to be used to determine the requisite conditions that must be present in order for the spread engine 20 to automatically generate line orders for the securities in the spread. In step 250, the new or revised spread is communicated to the spread engine 20 and stored or updated in the spread database 24.

The process for entry of market data processing and spread activation according to one embodiment of the present invention will now be described with reference to FIGS. 3a and 3b.

In step 310, the spread engine 20 continually accesses and receives market data in real-time (when available) relating to the securities in each spread stored in the spread database 24, via a connection to market data feeds 40. Based on each trader's preferences, the spread engine 20 may utilize FX Trader to continually access and receive market data for foreign currencies, as well.

When the market data is received, in step 315, the spread engine 20 derives market parameters from the current market data by continuously performing the appropriate operations, if any. For example, based on the trader's preferences (as indicated by the spread parameters), where market data is received for securities in foreign markets, the spread engine 20 continuously converts the market data to the currency selected by the trader in the spread parameters, utilizing the current foreign exchange rate as received from FX Trader. The spread engine 20 then derives the market parameters based on the foreign exchange rate. Where market data is received from FX Trader, that market data may be converted by FX Trader to the currency selected by the trader in the spread parameters. Other exemplary operations to arrive at the market parameters include receiving bid and ask prices and calculating the difference, calculating liquidity based on current bids and offers and the like.

In step 320, the trader views his spreads and the market parameters and execution parameters corresponding to each spread, via the trader's client station 10, to determine whether to activate or deactivate spreads in the trader's account. Where a spread is selected as "active" by the trader, the trader is authorizing the system to automatically generate line orders for securities within a spread whenever the spread is in-line and the rule checks selected by the trader for that spread are met. Market parameters and execution parameters relating to the spreads in a trader's account are stored as fields in the spread database 24 and are viewable by the trader via the graphical user interface at the trader's client station 10, for example, those exemplary GUIs of FIGS. 6-11, and are continuously updated as the spread engine 20 receives and processes market data from market data feeds 40 and execution data from the order execution server 30.

Additionally, the trader may view certain warnings on the client station 10 when an active spread deviates a certain percentage above or below the spread limit selected for that spread. The warnings initially displayed will be based on global default warning levels set by an administrator. However, warnings can be varied by the trader in the spread parameters for each spread that is created. For example, the trader may enter a Pre-Execution Spread Deviation Warning Level which is a percentage, or other indication (e.g., fixed amount), above or below the spread limit of an active spread that will initiate a passive warning. If a spread deviates from this level prior to the order execution server 30 initiating the order, a yellow flag will be displayed next to the corresponding spread viewable at the trader's client station 10. The trader may also enter a Post-Execution Spread Deviation Warning Level which is a percentage below the spread limit of an active spread that will initiate an active warning. If the spread deviates from this level after the order execution server 30 initiates the order, a pop-up warning will display and the spread will automatically be deactivated, if not already filled, thereby preventing orders to be filled when the spread is not longer initiated.

In step 325, the spread engine 20 reads the trader's active spreads. In step 330, the spread engine 20 determines whether an active spread is in-line with the current market parameters by applying the rule associated with the spread. According to the present embodiment of the invention, a spread is considered to be in-line when the Current Spread is greater than or equal to the Spread Limit. Thus, the rule can be expressed as: the spread is in-line if Current Spread>=Spread Limit. The Spread Limit generally is a value entered by the trader (or predetermined in alternate embodiments), which sets the minimum spread relationship between the two or more securities in a spread at which market orders for the securities should be executed. The Current Spread is the current spread value between two or more securities derived from real-time market data received by the spread engine 20.

More specifically, in the present embodiment, the Current Spread uses the ask price for the buy side of the spread and the bid price for the sell side, thereby assuming a worst-case scenario for executing the spread orders. Traders may specify, as a spread parameter, a ratio at which to determine whether to buy and sell shares of the securities in the spread—the Actual Ratio. Traders may also specify, as a spread parameter, a different ratio at which the trader would actually like to buy and sell shares of each security in the spread when the spread is in-line—the Order Ratio. Thus, the following is an example of the rule equations that are used by the spread engine 20 to determine if a spread is in-line:

Total Sell Price=Total of[each Sell Security Bid Price*Security's Actual Ratio];

Total Buy Price=Total of[each Buy Security Ask Price*Security's Actual Ratio]; and Current Spread=[Total Sell Price−Total Buy Price].

The following is an example applying the aforementioned rule equations to determine if a spread is considered in-line. In the example, the spread comprises one security on the buy side (IBM) and two securities on the sell side (CSCO and SUNW). The spread parameters include actual ratios of 1.0, 0.7 and 0.5 for IBM, CSCO and SUNW, respectively and order ratios of 1.0, 0.75 and 0.5 for IBM, CSCO and SUNW, respectively. Additionally, the sell side orders are to be short sells, and the Spread Limit is set at 3.00. Thus, the spread entry can be summarized as follows:

| Spread Entry | | | |
|---|---|---|---|
| Sell Name | Actual Ratio | Order Ratio | Sell Short |
| CSCO | 0.70 | 0.75 | Yes |
| SUNW | 0.50 | 0.50 | Yes |
| Buy Name | Actual Ratio | | Order Ratio |
| IBM | 1.00 | | 1.00 |

Spread Limit = 3.00

For purposes of this example, the relevant market data received from the market data feeds 40 is assumed to be as follows:

| Market Data | | | | |
|---|---|---|---|---|
| Symbol | Ask Size | Ask Price (USD) | Bid Size | Bid Price (USD) | Bid Uptick |
| IBM | 1500 | 28.00 | | | |
| CSCO | | | 500 | 30.00 | Yes |
| SUNW | | | 600 | 22.00 | Yes |

Applying the illustrative market data to the exemplary rules, the spread is determined to be in-line. More specifically, the Current Spread equals the total sell side less the total buy side. The total sell side is the bid price multiplied by the actual ratio for CSCO (30.00*0.70) and for SUNW (22.00*0.50) summed (32.00). The total buy side is the ask price multiplied by the actual ratio for IBM (28.00*1.00=28.00). The Current Spread is the difference (32.00−28.00=4.00). Because the Current Spread (4.00) is greater than the Spread Limit (3.00), the spread is in-line.

The trader may also choose to undo the effects of entering into a particular spread, a process referred to as "unwinding" the spread, in the spread parameters, which essentially switches the order sides for the securities in the spread. For example, the buy securities would become sell securities, and the sell securities would become buy securities. The equation used to calculate the Current Spread for the "unwound" spread is the total sell price less total buy price. Additionally, the spread is considered to be in-line when the Current Spread is less than or equal to the Spread Limit. Thus, the rule can be expressed as: the spread is in-line if Current Spread is less then or equal to Spread Limit.

In step 335, following a determination by the spread engine that an active spread is in-line, the spread engine applies the one or more rule checks selected by the trader (or administrator in alternate embodiments) for that spread to determine whether to generate line orders for the securities in the spread. In some embodiments, certain rule checks are prerequisites to certain types of orders and must be applied regardless of whether those rule checks have been specifically selected by the trader for a spread. The following are exemplary rule checks used in the present embodiment.

A "bid/offer size" rule check ensures that a line order is only generated by the spread engine when a minimum number of shares of any one or more identified security in the spread, as set by the trader in the spread parameters, can currently be bought or sold by the trader. This check is based on the current market liquidity, for example the average size of a number of the top bids or asks, the total number of shares in a number of the top bids or asks, and the like. In certain embodiments, if the rule check is not met, the line order is not generated; however, in the present embodiment, the system automatically reduces the size of the line orders according to the Order Ratios such that all of the orders do not exceed the then current liquidity.

A "round lot" rule check ensures that a line order for a security is only generated when the lot is round. In certain embodiments, if the order size is not a round lot, it will be rounded up or down to the nearest whole lot. As with other rule checks adjusting order size, where a lot on one side of a spread is rounded, it may be necessary to adjust the order size of the lot on the other side of the spread to ensure the proper ratio. The adjusted lot may then also need to be rounded to a whole lot.

A "last/bid tick direction" rule check ensures that a line order to sell a security short is only generated when the current bid tick direction is an uptick, as required by certain markets 50.

A "market(s) open" rule check ensures that line orders to buy and sell securities in a spread are only generated when the appropriate market(s) for each security is/are open, taking into account the different time zones and hours for each relevant market.

A "depth of market" rule check allows the trader to be more aggressive and look deeper into the market to view bids and offers outside of the current best bid and best offer for a security, and to consider increasing the quantity of the buy and sell orders desired by the trader. This may be implemented by accessing the order book of a specialist for a security trading on the NYSE or NASDAQ.

Other rule checks include comparing the trader's positions, either before or after the contemplated spread to limits, and preventing initiator of orders that would exceed such limits, thereby limiting the trader's exposure. Such limits may include limiting a position in a particular security or industry, limiting the monetary value of a buy or sell order to prevent excessive orders from being initiated, limiting a position involving exposure to a particular currency; and the like. Furthermore, such limits may be imposed on a trader-by-trader basis, or on a book-by-book (or other) basis where the trader trades as part of a group. In certain embodiments, the limits are preset, such as fixed values or percentages, while in other embodiments the limits are dynamic, based on data available to the system, such as market data, execution data, and parameters.

Continuing with the foregoing example, exemplary bid/offer size and last and bid tick direction checks will be applied. As for the bid/offering check, for purposes of the present example, the relevant spread parameters include the maximum number of shares for which orders are to be outstanding (e.g., 10,000), maximum number of shares per order (e.g., 1,000) and the minimum number of shares per order (e.g., 500).

The bid/offer size rule check requires a minimum quantity of each security (on each side of the spread) be available for a spread according to the following exemplary equations:

For each Buy Security, the Ask Size must be>=Actual Ratio*Minimum Order; and

For each Sell Security, the Bid Size must be>=Actual Ratio*Minimum Order:

For each Sell Security that is checked Sell Short, the last/bid tick direction rule check requires there must be an Uptick.

Applying these rule checks to the aforementioned illustrative market data, the spread passes the last and bid tick direction check because each of CSCO and SUNW had an uptick. As for the minimum size check, each of the securities passes this check, as follows. For IBM, the number of available shares (1,500) is greater than the actual ratio multiplied by the minimum order size (1.00*500=500). For CSCO, the number of available shares (500) is greater than the actual ratio multiplied by the minimum order (0.75*500=375). The same is true for SUNW (600>250).

Both the bid uptick for CSCO and SUNW are up, so the bid tic direction rule check is also met.

In step 340, following the determination that an active spread is in-line and passes the rule checks for that spread, the spread engine 20 automatically generates line orders for each security within the spread, based upon the Order Ratio chosen by the trader in the spread parameters for the spread and any modification required by the rule checks. For example, the quantity of shares to be traded for each security is also determined by the spread engine 20 by comparing current market parameters with the spread parameters selected by the trader. In one embodiment of the invention, as detailed in the earlier example given, the quantity of shares to be traded for each security is determined by comparing the order ratio for each security in the spread, the maximum shares, the maximum shares per order, and the minimum shares per order as entered by the trader, along with the bid size and ask size as received from the market data feeds 40. Thus, continuing with the foregoing example, the spread engine 20 also applies the minimum quantity requirement to determine the size of the market orders according to the order ratio chosen by the trader in the spread parameters for each security in the spread. Thus, as summarized in the table below, given the order ratios, because the available number of CSCO shares is 500, CSCO is the limiting security in terms of size of orders.

| Symbol | Side | Order Ratio | Num Shares |
|--------|------|-------------|------------|
| IBM    | B    | 1.0         | 667        |
| CSCO   | SS   | 0.75        | 500        |
| SUNW   | SS   | 0.50        | 333        |

In step 345, the line orders are displayed on the trader's client station 10. In step 350, the trader determines whether to confirm the one or more line orders. In step 355, if the trader confirms the one or more line orders, the spread engine 20 signals the order execution server 30 to initiate the one or more market orders for the securities in the spread. The spread engine 20 may allow the trader to cancel, or automatically signal the order execution server 30 to cancel, all existing market orders for securities in a spread where the spread falls out of line (becomes no longer in-line based on changes to market data) after the market orders are sent and none of the market orders relating to that spread have not yet been filled. In step 360, the spread engine updates and stores execution data, relating to the initiation of the market order, in the spread database 24.

In alternate embodiments, following the determination that an active spread is in-line and passes the rule checks for that spread, the spread engine 20 automatically generates market orders for each security within the spread. The spread engine 20 then automatically signals the order execution server 30 to initiate the one or more market orders for the securities in the spread. This process is automatic and it is not necessary for the trader to confirm the market orders before the spread engine 20 signals the order execution server 30 to initiate the one or more orders. However, in certain of such embodiments, the trader is still notified that the one or more market orders will be initiated, via a pop-up window on the trader's client station 10

According to the another embodiment of the invention, the Current Spread may also take into consideration a cash amount—the Cash Value. The Cash Value is a spread parameter entered by the trader, which is the cash amount received when the Sell Security is exchanged for the Buy Security at the time the securities are converted. As such, cash value is particularly appropriate to risk arbitrage scenarios involving a combined stock and cash transaction. Thus, the cash value is reflected in the current spread equation as follows: current spread=(total sell−total buy)+cash value. (In the present embodiment, the default, where no value is entered, is 0). The following is an example, based on the foregoing example, applying the aforementioned rule equations and taking Cash Value into consideration, to determine if a spread is considered in-line. This example assumes the same parameters as with the foregoing example, including a cash value of 9.00, and the following market data.

| Market Data | | | | | |
|---|---|---|---|---|---|
| Symbol | Ask Size | Ask Price | Bid Size | Bid Price | Bid Uptick |
| IBM | 1500 | 28.00 | | | |
| CSCO | | | 500 | 21.00 | Yes |
| SUNW | | | 600 | 15.00 | Yes |

Accordingly, the spread is in-line because the current spread equals 3.20 (Current Spread=(Total Sell−Total Buy)+Cash= (22.20−28.00)+9.00=3.20), which is greater than the spread limit (3.00).

Figure 4:
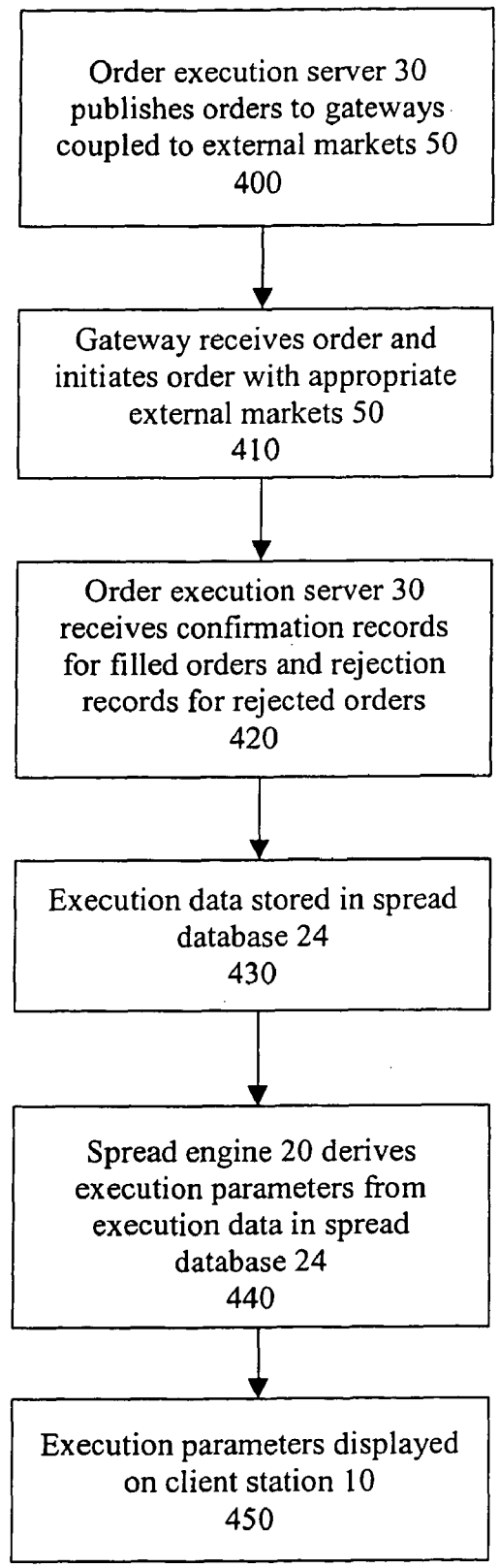
FIG. 4 is a flow chart illustrating the process of order execution according to one embodiment of the present invention.

The process for order execution according to one embodiment of the present invention will now be described with reference to FIG. 4.

When market orders for securities are received from the spread engine 20, the order execution server 30 publishes the market order or orders to a plurality of gateways, as shown in step 400. Such orders may include multiple security orders on each the buy and sell sides, as well as foreign exchange orders associated with either side generated by FX Trader. The gateway coupled to the appropriate external market 50 for the security in the market order receives and recognizes the market order and initiates the order with the appropriate external market 50, in step 410.

In step 420, the order execution server 30 receives confirmation records via the appropriate gateway for filled orders and rejection records for rejected market orders. These confirmation or rejection records are sent to the spread database 24 as execution data, in step 430. Where confirmation and rejection records for orders in foreign markets is received, the spread engine 20 also converts the execution data in these records to the currency selected by the trader in the spread parameters, utilizing the current exchange rate or the exchange rate at the time that the order was initiated, depending upon the execution parameter. Where execution data is received from FX Trader, that execution data may be converted by FX Trader to the currency selected by the trader in the spread parameters. In step 440, the spread engine 20 derives execution parameters from execution data stored in the spread database 24. In step 450, the spread engine displays these execution parameters on the trader's client station 10.

In certain embodiments of the present invention, when a market order for a security is filled by an external market 50, the order execution server 30 receives a confirmation record, via the appropriate gateway, from the external market 50, containing information relating to the filled market order. The order execution server 30 sends the confirmation record to the spread database 24.

When a market order is unable to be filled by an external market 50, the order execution server 30 is notified as such from the external market 50 and passes a rejection record containing information relating to the rejected market order to the spread database 24. In the present embodiment, the database 24 is updated accordingly and a window will appear on the user's client station 10 indicating that the market order(s) has been rejected.

In alternate embodiments, when a market order is rejected by an external market 50, the order execution server 30 will reroute the market order, via the appropriate gateway, to an alternate external market 50 for the corresponding security, if an alternate exchange market for the security exists and is accessible. If the market order is filled by the alternate external market 50, the order execution server 30 receives a confirmation record from the alternate external market 50, containing information relating to the filled market order, and the steps mentioned above are followed, along with notifying the trader that the market order was filled in the alternate external market 50.

When a market order is unable to be filled by any external market after a certain number of attempts, the order execution server 30 will send a rejection record containing information relating to the rejected order to the spread database 24. The spread engine 20 will automatically signal the order execution server 30 to cancel all existing market orders for securities in a trader's spread that have not yet been filled. The order execution server 30 sends the rejection record to the spread database 24.

Figure 5A:
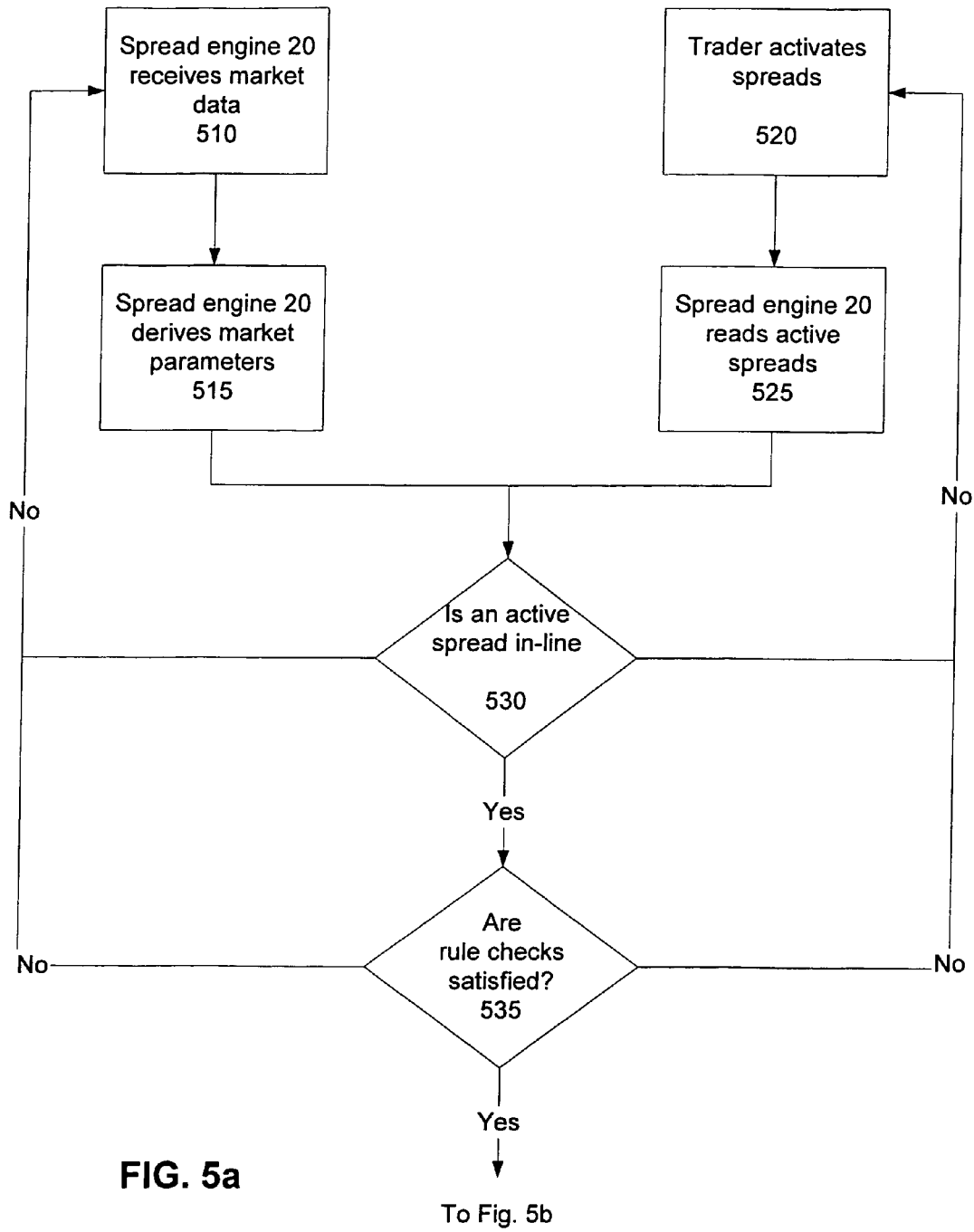
FIGS. 5a, 5b, and 5c are flow charts illustrating the process of legging according to one embodiment of the present invention.
Figure 5B:
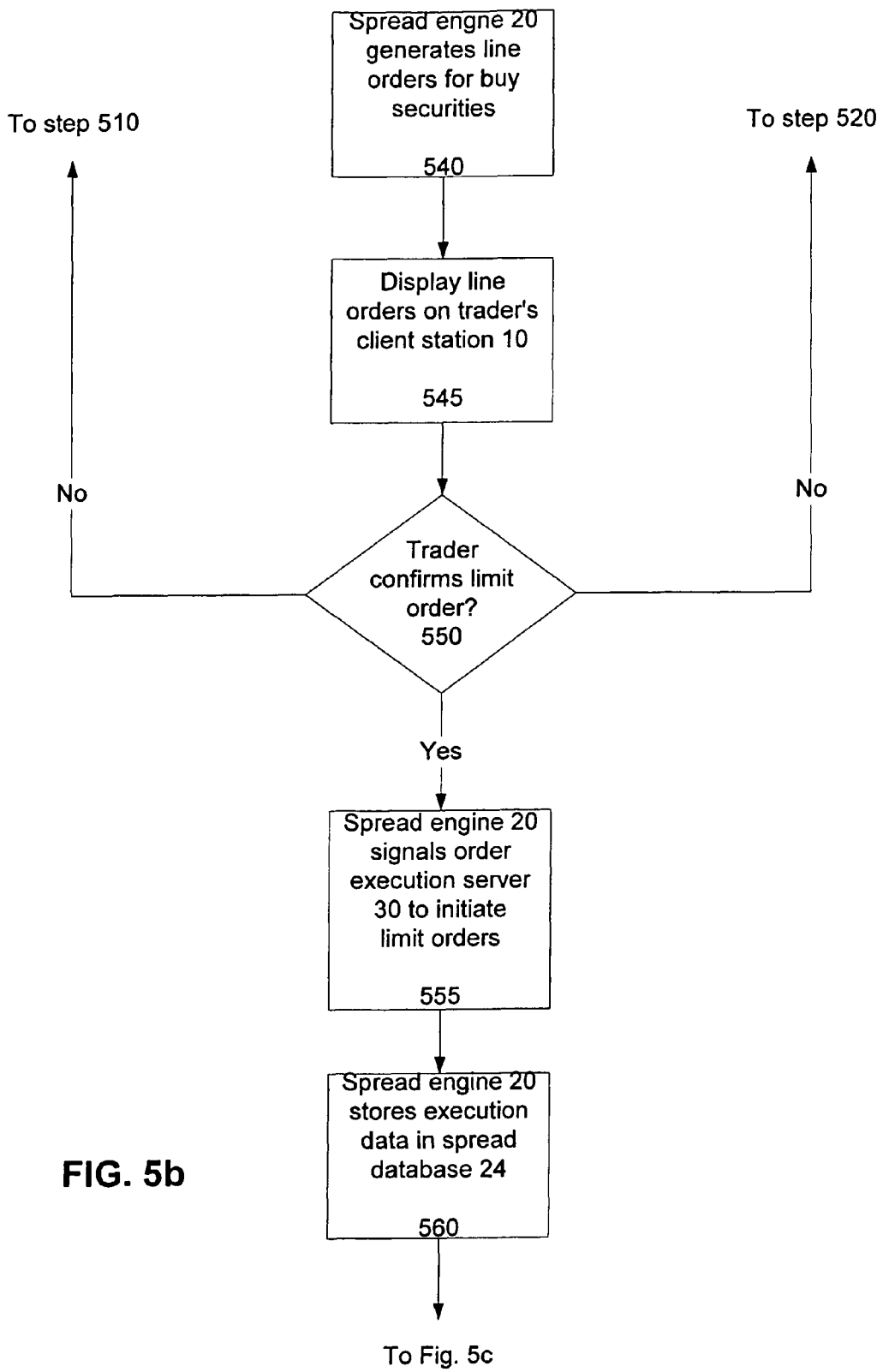
Figure 5C:
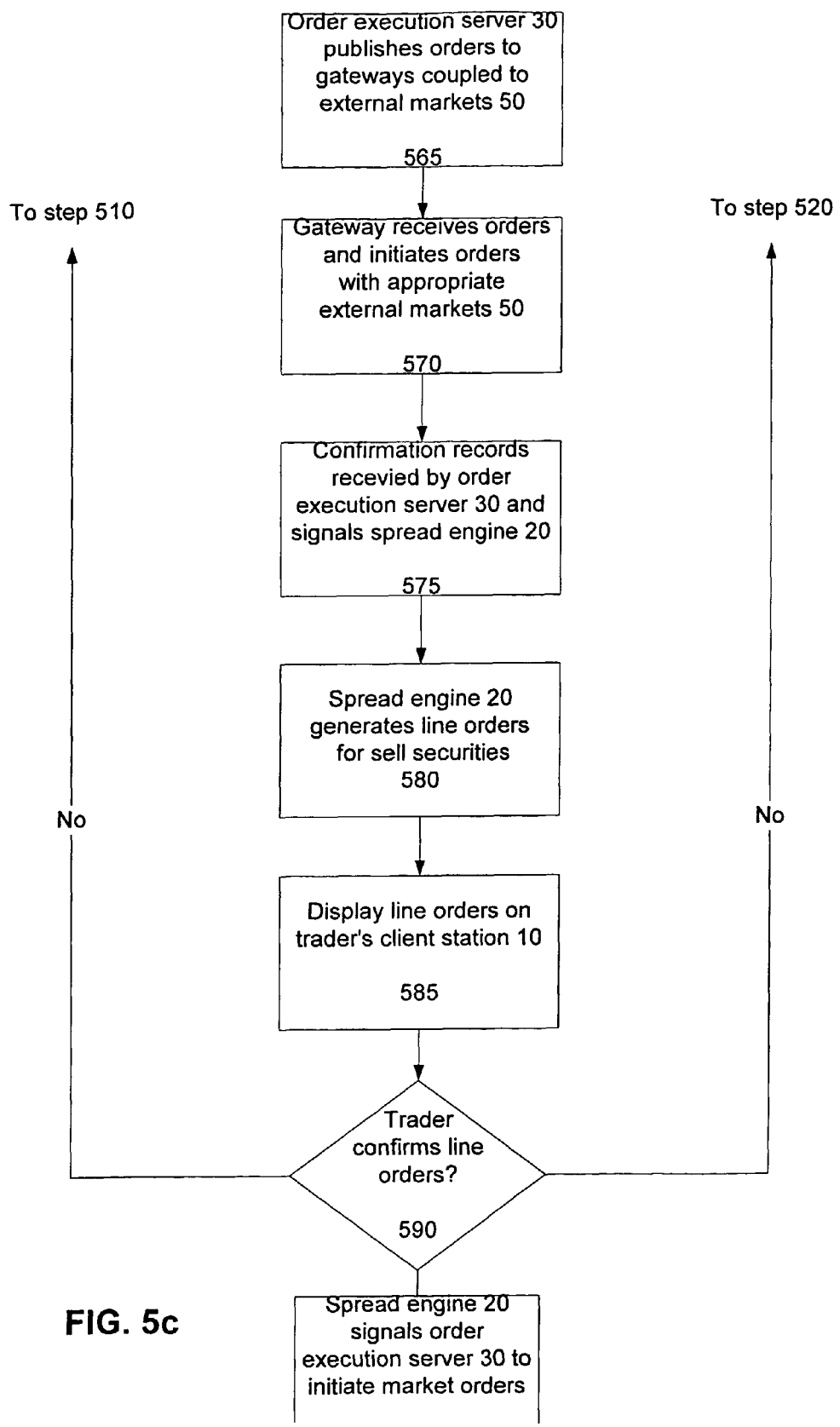

FIGS. 5a, 5b, and 5c are flow charts illustrating market data processing, spread activation, and order execution for legging into a trade, where the trader has chosen to use the legging spread calculation, according to a further embodiment of the present invention.

Figure 3A:
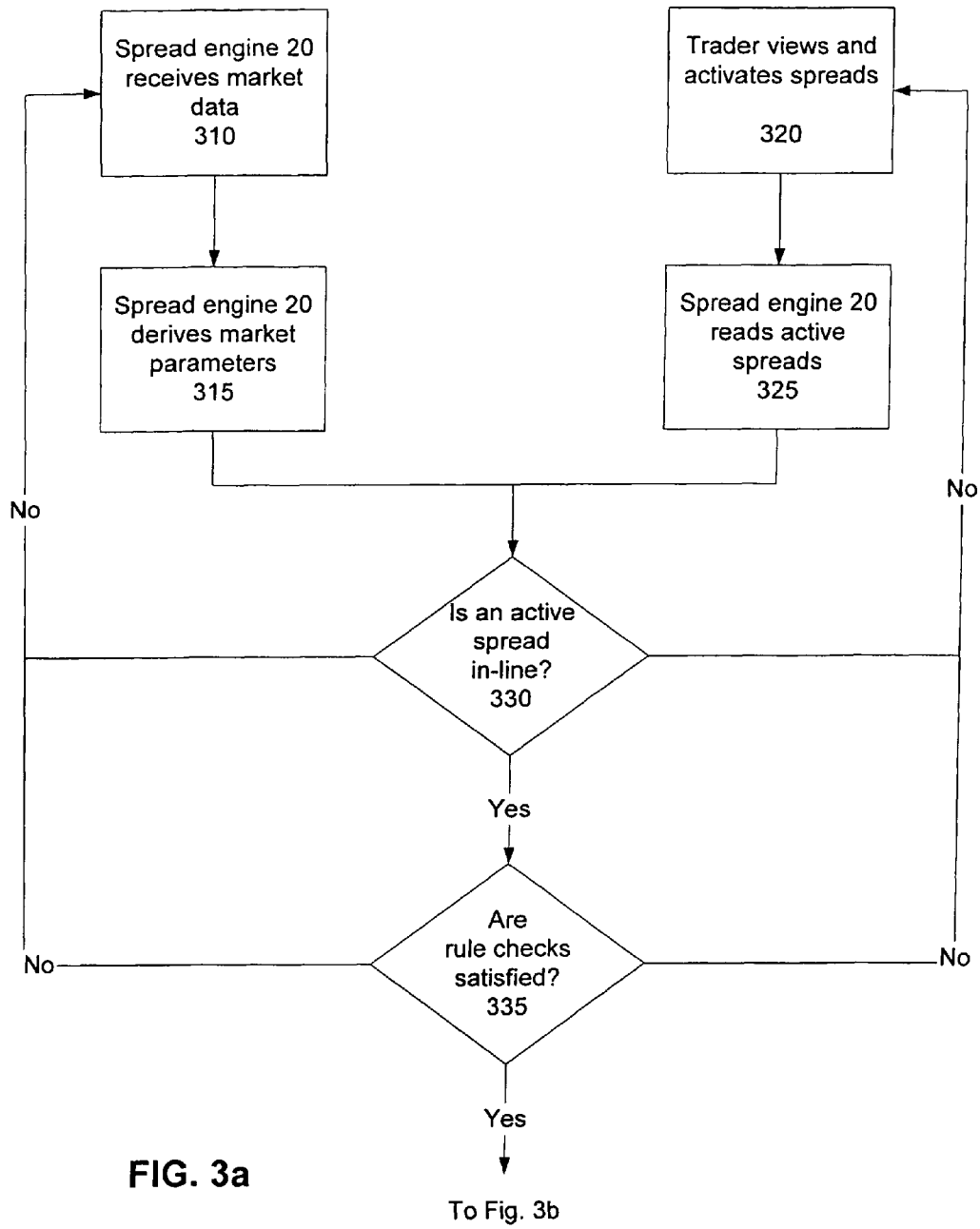
FIGS. 3a and 3b are flow charts illustrating the process of spread activation according to one embodiment of the present invention.
Figure 3B:
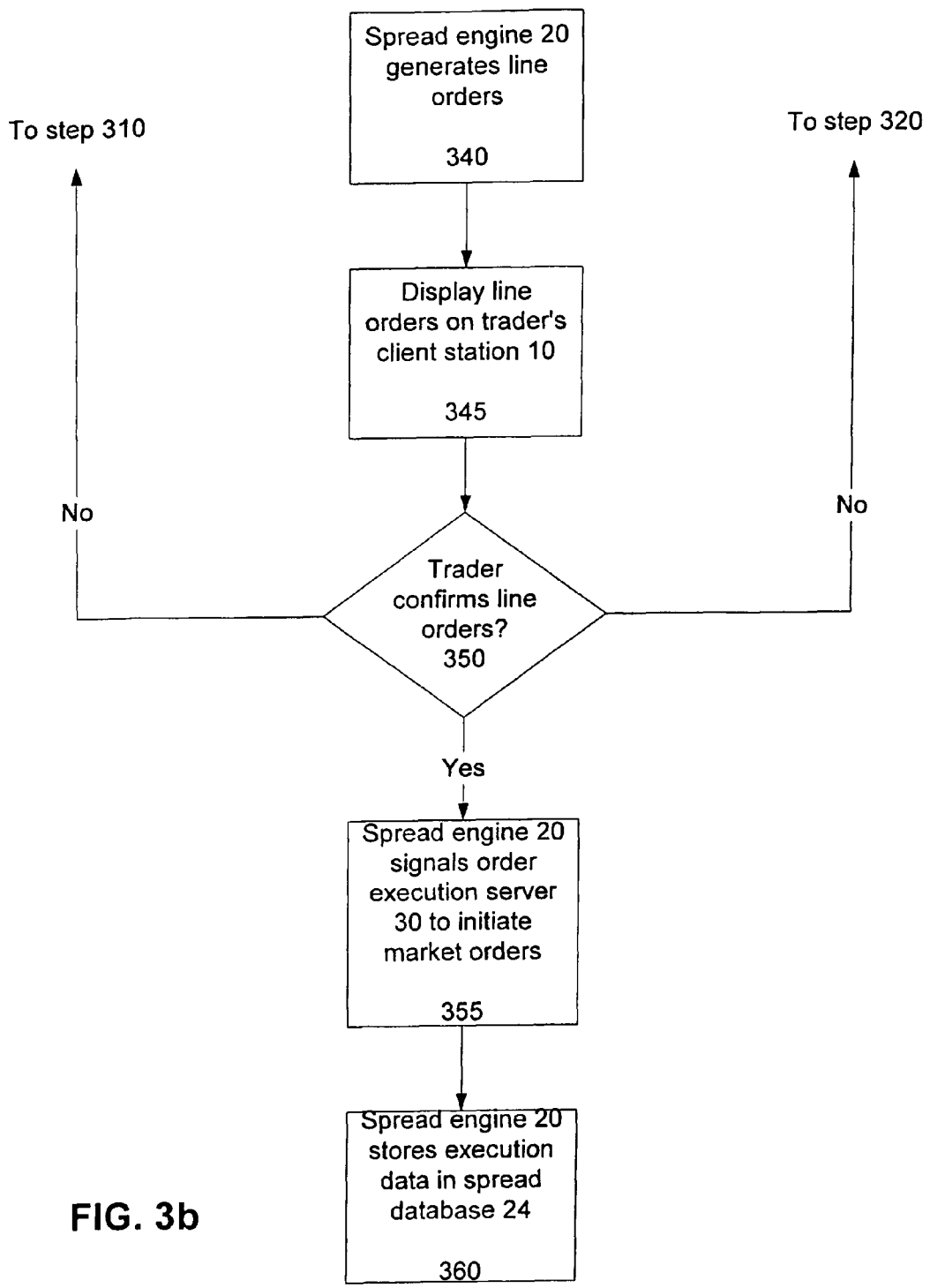

The present legging embodiment, as shown in FIGS. 5a and 5b, mirrors the process of FIGS. 3a and 3b. Thus, steps 310-360 mirror steps 510-560. However, the spread engine 20 determines whether each legged spread is in-line in a manner different from non-legged spreads. As an initial matter, it should be noted that in addition to normal and unwind spreads, spreads may be legged from sides, the buy side (i.e., a bid setup spread) or the sell side (i.e., an offer setup spread). An exemplary process of determining whether a bid setup spread is in-line will now be described.

After the spread engine 20 reads the trader's active spreads, the spread engine 20 determines whether an active legged spread is in-line with the current market parameters. In the present legging embodiment, a bid setup spread is considered to be in-line when the Legged Current Spread is greater than or equal to the Legged Spread Limit. The Legged Spread Limit is analogous to the Spread Limit for the non-legged spreads; however, the Legged Spread Limit equals the Spread Limit plus a Legged Spread Difference. The Legged Spread Difference is an amount (spread parameter) entered by the trader (or preset in alternate embodiments), which represents the amount away from the Spread Limit that the spread engine 20 uses to determine when to leg into the trade. More specifically, the system needs to send out the line order such that the minimum executed spread would be the Legged Spread Limit. In the legging embodiment, the Legged Current Spread uses the bid price for the buy side of the spread and the bid price for the sell side of the spread. Thus, the spread is deemed to be in-line when the Legged Current Spread is greater than or equal to the Legged Spread Limit. In the present embodiment, the trader sets the Legged Spread Difference and Spread Limit, as well as the Actual Ratio and Order Ratio, as with non-legged, normal spreads.

Thus, the following is an example of the rule equations that may be used by the spread engine 20 to determine if a bid setup spread is in-line in the present legging embodiment. Notably, unlike the normal spread, the Legged Current Spread uses the bid price on the sell side and the bid price on the buy side.

A spread is in-line if Legged Current Spread>=Legged Spread Limit;

Legged Spread Limit=Legged Spread Limit+Legged Spread Difference;

Total Sell Price=Total of[each Sell Security Bid Price*Security's Actual Ratio;

Total Buy Price=Total of[each Buy Security Bid Price*Security's Actual Ratio; and Legged Current Spread=[Total Sell Price−Total Buy Price]+cash value (if any).

The following is an example applying the aforementioned rule equations to determine if a Bid Setup Spread is considered in-line. The preset example assumes the following parameters and data:

| Spread Entry | | | |
|---|---|---|---|
| Sell Name | Actual Ratio | Order Ratio | Sell Short |
| CSCO | 0.70 | 0.75 | Yes |
| SUNW | 0.50 | 0.50 | Yes |
| Buy Name | Actual Ratio | Order Ratio | |
| IBM | 1.00 | 1.00 | |

Spread Limit = 3.00
Legged Spread Difference = 1.00
Maximum Shares = 10,000
Maximum Shares Per Order = 1000
Minimum Shares Per Order = 500

| Market Data | | | | | |
|---|---|---|---|---|---|
| Symbol | Ask Size | Ask Price | Bid Size | Bid Price | Bid Uptick |
| IBM | 1500 | | | 27.00 | Yes |
| CSCO | | | 500 | 30.00 | Yes |
| SUNW | | | 600 | 22.00 | Yes |

When the foregoing parameters are applied to the foregoing market data, the spread is considered in-line. The Legged Current Spread, which equals 5.00 (Total Sell−Total Buy)= (32.00−27.00), is greater than the Legged Spread Limited, which equals 4.00.

(Spread Limit+Legged Spread Difference=3.00+1.00=4.00)

Following a determination by the spread engine that an active spread is in-line, the spread engine 20 applies the one or more rule checks selected by the trader (or administrator in alternate embodiments) for that spread to determine whether to generate limit order(s) for the Buy Securities in the spread and/or to determine the terms of the limit order(s). Exemplary rule checks, in the legging embodiment, are the following.

In the present embodiment, the first rule check relates to calculating the price at which the limit orders are sent. In general, for a bid setup spread, the limit price is the best bid price, if possible while keeping the spread in-line, if not, the price can be lower, as described below. With an offer setup spread, the limit price is the best offer price, if possible, while keeping the spread in-line; if not, a higher price can be used, as described below. To calculate the price, the spread engine 20 first calculates a variable representative of the difference, in cents, from the best offer price that will result in the associated legged spread limit. The variable is equal to the legged spread difference plus the normal spread limit minus the current normal spread. For a bid setup spread, a positive number represents the minimum number of cents lower than the best bid the permit order price must be, while keeping the spread in-line. For an offer setup spread, a positive number represents the minimum number of cents higher than the best offer the permit order price must be, while keeping the spread in-line. If such bid setup price is less than the best bid, the system uses the price as calculated, because using the best bid would cause the spread to no longer be in-line. On the other hand, if the calculated price is not less than the best bid, then the limit order price used is the best bid price. As will be described below, in the present embodiment, this price is subject to change based upon applicability of further rule checks.

Having identified, at least in the first instance, the price for the limit order, the spread engine 20 proceeds to determine the quantity for the order. Specifically, the system takes into consideration market liquidity to insure that, assuming the limit order is executed, sufficient liquidity exists for expeditious execution of the sell side market order after the limit order is executed. Thus, in the present embodiment, the spread engine 20 limits the size of the limit order based upon the availability, or liquidity, of securities comprising the one or more market orders. In the present embodiment, the size of the limit order is limited to the number of shares based upon one-third of the available shares for the securities comprising the market orders and application of the order ratio to that one-third quantity. In other words, the size of the limit order equals one-third of the available securities for the market orders divided by the order ratio. Where multiple sell side market orders exist, the size of the limit order is the lesser of the amounts as determined based upon each of the securities for each of the market orders. It should be noted that although one-third is used in the current embodiment, other fractions are within the scope of the present invention and, furthermore, such fraction may be the same across all securities or specific to each security based upon any of a number of factors, including average volume, relative liquidity, volatility, trade exposure, and the like. As such, such minimum size requirements may be predetermined or dynamically determined based on market or trader conditions.

In the present embodiment, the next rule check adjusts the limit price if the liquidity justifies doing so. In general, this rule check serves as a protection against having a limited order that does not execute. Specifically, the rule check of the present embodiment involves in spread engine 20 raising the limit order price by some amount, such as one cent, on a buy limit order, or decreasing the limit order price by some amount, such as one cent, on a sell limit order, if two conditions are met, namely: (1) the limit order quantity is at least 50% of the current market order quantity on the same side (i.e. buy or sell); and (2) the limit order price equals the best bid price for a buy limit order or equals the best offer price for a sell limit order. Notably, this rule check is an exception to the first general rule check requirement that the bid limit price be the best bid price.

Furthermore, in certain embodiments, this rule check continuously is applied after a limit order has been sent, but not yet filled, by continually monitoring the changes in the market and canceling (and possibly re-issuing) the limit order where the limit order quantity is no longer at least 50% of the market order quantity. Furthermore, it is to be understood that it is within the scope of the present invention for the rule check to require different conditions before adjusting the price, for example requiring the limit order quantity to be a different percentage of the market order quantity. Additionally, it is within the scope of the present invention to adjust the price by some amount other than one cent, including other fixed amounts, other variable amounts, percentages of the current calculated limit order price, some fraction of the market price, and the like.

In the present embodiment, the spread engine 20 performs yet another rule check. This rule check, which is an exception to the foregoing rule check, causes the spread engine 20 to examine the limit order price and to remove the adjustment to the price resulting from the foregoing rule check if the limit order price is equal to the current market offer price for a buy limit order and to remove the price adjustment if a sell limit order price is equal to the current market bid. In such scenarios, the adjusted price would cause the limit order to essentially be a market order and thus have the legged spread mirror a normal spread.

It should be understood that any combination of the foregoing rule checks may be used, including those described in connection with the normal spreads, as well as other rule checks. Such other rule checks may involve continuous monitoring of market data and recalling and/or re-issuing of the limit orders. For example, where a limit order for the Buy Security is only partially filled, the spread engine 20 may immediately hedge the limit order by initiating a partial market order for the Sell Security at the Order Ratio chosen by the trader in the spread parameters. Similarly, the spread engine 20 may cancel limit orders that have not yet been filled where the entire market order can no longer be filled based upon changes to the current market Bid/Ask Prices and/or Bid/Ask Sizes.

Thus, following the determination that an active spread is in-line, and passes the rule checks, the spread engine 20 automatically generates a limit order (or multiple, based on the spread) for the each Buy Security within the spread, based on the spread parameters and rule checks for the spread. The one or more limit orders are displayed on the trader's client station 10. The trader determines whether to confirm the one or more limit orders. Although in alternative embodiments, as with the normal spreads, no confirmation is required and the orders are initiated automatically when in-line and when they have passed the applicable rule checks. If the trader confirms the one or more limit orders, the spread engine 20 signals the order execution server 30 to initiate the one or more limit orders.

In step 565, when limit orders for securities are received from the spread engine 20, the order execution server 30 publishes the limit orders to a plurality of gateways. In step 570, the gateway coupled to the appropriate external market 50 for each Buy Security in the limit orders recognizes and receives the limit order and initiates the order with the appropriate external market 50.

As with normal spreads, the spread engine 20 may also generate foreign exchange transactions to flatten out trades and remove currency exposure. Orders for such foreign exchange transactions may be initiated at different times, for example simultaneously with the limit order, after execution of the limit order, simultaneously with the market order, or after execution of the market order. In addition, the flattening out or hedging of foreign exchange exposure may be performed on an order-by-order basis, spread side-by-spread side basis, or on a spread-by-spread basis. Furthermore, such hedging need not be performed for all trades; for example, the system may allow a trader to select whether or not to enter into an offsetting foreign exchange transaction, or the system may automatically enter into one or more foreign exchange transactions when the trader's (or group of traders') exposure to a particular foreign currency reaches a certain limit.

In step 575, the order execution server 30 receives one or more confirmation records that the limit orders for each Buy Security have been filled, and sends the one or more confirmation records to the spread engine. In step 580, the spread engine generates a market order for each Sell Security based upon the Order Ratio chosen by the trader in the spread parameters for the spread. In step 585, the market order is displayed on the trader's client station 10. In step 590, the trader determines whether to confirm the market order although in certain embodiments the market order is automatically sent to the appropriate market 50. In step 595, if the trader confirms the market order, the spread engine 20 signals the order execution server 30 to initiate the market order.

As noted above, the legging process described in the above embodiment and shown in FIGS. 5a, 5b, and 5c may also be accomplished where the trader wishes to send limit orders for Sell Securities and market orders for Buy Securities. To determine if an offer setup spread is in-line, the following equations would be used:

A spread is in-line if Legged Current Spread>=Legged Spread Limit;

Legged Spread Limit=Legged Spread Limit+Legged Spread Difference;

Total Sell Price=Total of[each Sell Security Offer Price*Security's Actual Ratio;

Total Buy Price=Total of[each Buy Security Offer Price*Security's Actual Ratio; and Legged Current Spread=[Total Sell Price−Total Buy Price]+cash value (if any).

Furthermore, the trader may also choose to "unwind" a Bid Setup Spread or an Offer Setup Spread, as indicated in the spread parameters, which switches the order sides for the securities in the spread. For example, in the Bid Setup Spread, the Buy Securities would become Sell Securities, and the Sell Securities would become Buy Securities. The equation used to calculate the Unwind (Bid) Spread for the Bid Unwind Spread remains the same. However, a spread is considered to be in-line if the Unwind Bid Spread is less than or equal to the Bid Spread Limit.

As noted above, in certain embodiments, where an order for a security in a foreign currency is filled and the trader has selected a currency into which the transaction is to be converted, an FX Order will be initiated to offset the resulting foreign exchange exposure to the trader. For example, in a normal spread calculation, when the order execution server 30 receives a confirmation record for a filled market order (whether on the buy or sell side; short or long, etc.) for a security in a foreign currency, e.g., as in step 420, the order execution server 30 forwards the confirmation record to the spread engine 20. The spread engine 20 accesses the current foreign exchange currency pair rate from the FX market feed 44 for the currency of the security in the filled order and the currency selected by the trader in the spread parameters. The spread engine 20 determines the FX Order necessary to offset the trader's foreign exchange exposure resulting from the filled order of the security in the foreign currency. The execution parameters of the FX Order (e.g., size) is based on the price and quantity of the filled order. The spread engine 20 signals the order execution server 30 to initiate the FX Order with the FX external market 54. Once the FX Order is sent out, a new order for the security in the foreign currency may be sent out, even if the FX Order has not yet been filled or is even rejected. In other words, the FX Order and the security order are independent of each other once the FX Order is sent out to be filled. In this way, a spread that is in-line is not delayed in sending out the next buy/sell order pair if the FX Order is taking a longer than normal time to fill. In alternate embodiments, the FX order and spread orders are not independent.

In a legging spread calculation, when the order execution server 30 receives a confirmation record for a filled limit or market order for a security in a foreign currency and the trader has selected to hedge the foreign currency exposure, the above-mentioned steps will be performed to initiate an FX Order necessary to offset the trader's foreign exchange exposure. Such FX order may be automatically generated before a legged limit order for a foreign security is sent, in which case the execution parameters of the FX order would be based on the parameters of the limit order and the then-current FX currency pair rate, or the FX order may be generated and sent after the limit order is filled, in which case the FX order would be based on the confirmation of the limit order and the then-current currency pair rate.

In alternate embodiments for normal and legging spread calculations, the spread engine 20 may generate a line order, to be confirmed by the trader on their client station 10, before signaling the order execution server to initiate the FX Order, while in other embodiments the FX order is initiated and sent automatically. Additionally, in certain embodiments, where the trader has not selected a currency into which all transactions are to be converted, the spread engine 20 will offset the trader's foreign exchange exposure by initiating a transaction for U.S. Dollars. It is to be understood that initiation of an FX Order in the foregoing embodiments may be performed in any suitable order, combined into fewer steps or divided into more steps.

The following are examples applying the aforementioned initiation of an FX Order to offset the resulting foreign exchange exposure to the trader. In the present example, the spread involves one security on each the buy side (VOD) and the sell side (AMR). The cash value is assumed to be zero. Furthermore, the ".L" after symbol VOD indicates that this security is traded on the London Stock Exchange, and the ".N" after symbol AMR indicates that this security is traded on the New York Stock Exchange. Thus, in this example, the system will be hedging British pounds (GBP; £).

The exemplary parameters, which may be specified by the trader as spread parameters or specified by the system administrator, and market data are as follows:

|       | Bid     | Offer   | Bid/Offer Size | Actual/Order Ratio |
|-------|---------|---------|----------------|--------------------|
| VOD.L | £1.2000 | £1.2025 | 5400/1200      | 1.0 (Buy Security) |
| AMR.N | $10.80  | $10.81  | 6300/1500      | 0.4 (Sell Security)|

Max shares per order = 5000
Min shares per order = 100

|         | FX Bid  | FX Offer |
|---------|---------|----------|
| GBP/USD | $1.6637 | $1.6641  |

Buy Hedge FX = USD
Sell Hedge FX = USD
Spread FX = USD
Cash FX = USD
Hedge Spread FX = USD Spread FX means that the trader wants the current spread calculated in the stated currency, namely United States Dollars (USD). The Spread Limit entered by the trader is also in the stated currency, as is the current spread.

Cash FX means that any cash component in the spread is in the stated currency. In the present embodiment, whatever cash is received in a spread deal is settled in the currency stated in Spread FX. So if Cash FX and Spread FX are different, an FX order is automatically generated by the system.

Hedge Spread FX means that the trader wants to settle the executed spread of each buy/sell pair in the stated currency. So if Spread FX and Hedge Spread FX are different, an FX order is automatically generated by the system.

In this example, after the trader buys shares of VOD, the trader needs to buy British pounds (GBP) using US Dollars (USD) since Buy Hedge FX is USD. If Buy Hedge FX was EUR, meaning Euros, the trader would buy GBP using Euros. If Buy Hedge FX was GBP, no FX order would be generated since this means the trader already have GBP available to settle the VOD order.

The system operation is similar for Sell Hedge FX as for Buy Hedge FX. If Sell Hedge FX was EUR, the USD the trader would receive for selling AMR would be sold in return for EUR. Since in our example Sell Hedge FX is USD, no FX order will be generated.

As with any spread, the spread engine 20 needs to calculate the current spread to see if the spread is in-line, and therefore send a buy/sell order wave if is in-line. Since in this example the trader has selected two securities trading in different currencies, the trader needs to normalize to one currency to determine if the Spread is in-line. Spread FX represents that normalized currency.

So, in this example, since Spread FX is USD, the trader needs to convert the market offer for VOD into USD. In this example, the market offer for VOD is £1.2025.

Since the trader is buying VOD, the trader will use the market FX offer to convert the market offer for VOD into USD. In this example, the market FX offer for GBP is $1.6641.

Therefore, the system uses the following equations to determine whether the spread is in-line:

Current Spread=(Sell Security Bid Price*Actual Ratio)−(Buy Security Ask Price*Actual Ratio)+ Cash; and Current Spread=($10.80*0.4)−((£1.2025*$1.6641) *1.0)+$0

Current Spread=$2.32.

Different foreign stock exchanges can have either taxes, levies, or both. Likewise a broker that trades a security can charge a commission. There are a few ways they all can be represented, for example, either as a fixed amount per order, as cents per share, or as basis points. If an exchange and/or broker handling the security has any of these values, the present embodiment factors them into the price of the security.

For example, if the trader goes through a broker that trades on the London Stock Exchange and it charges a commission of 2.5 basis points, the price the trader assumes he or she will pay for VOD will no longer be the market offer; rather the market offer plus commission.

Therefore, Buy Security Ask Price will now be £1.2025+ (1.2025*0.00025)=1.2028; and Current Spread=($10.80*0.4)−((£1.2028*$1.6641) *1.0)+$0, which equals:

Current Spread=$2.32.

Assuming for the purposes of this example that the trader sets a Spread Limit of 2.30, the spread is in-line and the buy and sell orders can be sent out. However, unlike US markets, most foreign exchanges do not accept market orders. Therefore, the system will send out a limit order for all non-US securities. This determination is automatically performed by the system, for example, as a rule check that results in creation of the appropriate limit order(s).

Accordingly, with the spread currently in-line, the system sends out a limit order for VOD and a market order for AMR. The limit price for VOD will be £1.2025, knowing that with a 2.5 basis point commission, the trader will be, in essence, paying £1.2028 per share. The order quantity for the VOD order will be 1200. As for AMR, the trader will send a market order for 1200*0.4=480 shares.

When the trader gets filled on VOD, since Buy Spread FX is USD, the trader needs to buy GBP using USD to pay for the order. If the trade was executed at £1.2028, the trader needs to buy 1200*£1.2028=£1443.36 to offset the GBP exposure. So an FX order to buy £1443.36 will be sent out to the FX market. Since the current FX offer is $1.6641, it will cost the trader $2401.8954 to receive the aforementioned GBP amount.

As stated before, Hedge Spread FX means that the trader wants to settle the executed spread of each buy/sell pair in the stated currency. In this example, since both Spread FX and Hedge Spread FX are in the same currency, an FX order will not be generated for this part, although in alternate embodiments where the two are different, a corresponding foreign exchange transaction is automatically generated.

Another illustrative example, in which the spread includes the same securities and a cash value, will now be described. The following spread parameters and market data are assumed:

| | Bid | Offer | Bid/Offer Size | Actual/Order Ratio |
|---|---|---|---|---|
| VOD.L | £1.2000 | £1.2025 | 5400/1200 | 1.0 (Buy Security) |
| AMR.N | $10.80 | $10.81 | 6300/1500 | 0.4 (Sell Security) |

Cash = 2
Commission for London securities = 2.5 basis points

| | FX Bid | FX Offer |
|---|---|---|
| GBP/USD | $1.6637 | $1.6641 |

Buy Hedge FX = USD
Sell Hedge FX = USD
Spread FX = USD
Cash FX = USD
Hedge Spread FX = USD Applying the foregoing parameters and data results in the following operation and transactions, since Buy Hedge FX is USD, an FX order will be generated once VOD is filled. The current spread is determined as follows:

Buy Security Ask Price=£1.2025+(£1.2025* 0.00025)=1.2028;

Current Spread=($10.80*0.4)−((£1.2028*$1.6641) *1.0)+$2;

Current Spread=$4.32.

If Spread Limit greater than or equal to $4.32, the spread is in-line and the system sends out a VOD-Limit Order (because the London Stock Exchange does not accept market orders) for 1200 at £1.2025, and an AMR-Market Order for 480.

Assuming that the VOD order is filled at £1.2028, the system settles in USD as follows:

1200*£1.2028*$1.6641=$2401.8954.

Yet another illustrative example will now be described based on the following parameters and data:

| | Bid | Offer | Bid/Offer Size | Actual/Order Ratio |
|---|---|---|---|---|
| VOD.L | £1.2000 | £1.2025 | 5400/1200 | 1.0 (Buy Security) |
| AMR.N | $10.80 | $10.81 | 6300/1500 | 0.4 (Sell Security) |

Cash = 2
Commission for London securities = 2.5 basis points

| | FX Bid | FX Offer |
|---|---|---|
| GBP/USD | $1.6637 | $1.6641 |

Buy Hedge FX = GBP
Sell Hedge FX = USD
Spread FX = USD
Cash FX = GBP
Hedge Spread FX = USD Since Buy Hedge FX is GBP, no FX order will be generated. Since Cash FX is GBP, the cash component must be converted to USD for the Current Spread calculation. Since this is a "setup" spread, the trader will be receiving £2 for each share of VOD bought. Since Spread FX is USD, the trader will be selling the £2 for each share of VOD bought to receive USD. The determination as to whether the spread is in-line is as follows:

Buy Security Ask Price=£1.2025+(£1.2025* 0.00025)=1.2028;

Current Spread=($10.80*0.4)−((£1.2028* $1.6641)*1.0)+(£2*$1.6637);

Current Spread=$5.65.

If Spread Limit greater than or equal to $5.65, the spread is in-line and the system sends out
a VOD-Limit Order for 1200 at £1.2025, and
an AMR-Market Order for 480.
Assuming that the VOD order is filled at £1.2028, the system settles in USD as follows:
1200*£1.2028*$1.6641=$2401.8954 needed to pay for VOD.
The system also settles the cash component as follows:
1200*£2*$1.6637=$3992.88 received
Yet another illustrative example will now be described based on the following parameters and data:

|  | Bid | Offer | Bid/Offer Size | Actual/Order Ratio |
|---|---|---|---|---|
| VOD.L | £1.2000 | £1.2025 | 5400/1200 | 1.0 (Buy Security) |
| AMR.N | $10.80 | $10.81 | 6300/1500 | 0.4 (Sell Security) |

Cash = 0
Commission for London securities = 2.5 basis points

|  | FX Bid | FX Offer |
|---|---|---|
| GBP/USD | $1.6637 | $1.6641 |

Buy Hedge FX = GBP
Sell Hedge FX = GBP
Spread FX = GBP
Cash FX = GBP
Hedge Spread FX = GBP Since Sell Hedge FX is GBP, an FX order will be generated once AMR is filled. Since Spread FX is GBP, the Current Spread and Spread Limit will be in GBP. The current spread is calculated as follows:

Current Spread=(($10.80/1.6637)*0.4)−(£1.2028*1.0)+£0

Current Spread=£1.39

If Spread Limit greater than or equal to £1.39, the spread is in-line, and the system sends out
a VOD-Limit Order for 1200 at £1.2025, and
an AMR-Market Order for 480.
Assuming that the AMR order is filled at $10.80, the system settles in GBP as follows:
480*$10.80/$1.6637=£3115.9464 received for selling AMR.
Yet another illustrative example will now be described based on the following parameters and data:

|  | Bid | Offer | Bid/Offer Size | Actual/Order Ratio |
|---|---|---|---|---|
| VOD.L | £1.2000 | £1.2025 | 5400/1200 | 1.0 (Buy Security) |
| AMR.N | $10.80 | $10.81 | 6300/1500 | 0.4 (Sell Security) |

Cash = 0
Commission for London securities = 2.5 basis points

|  | FX Bid | FX Offer |
|---|---|---|
| GBP/USD | $1.6637 | $1.6641 |

Buy Hedge FX = GBP
Sell Hedge FX = GBP
Spread FX = GBP
Cash FX = GBP
Hedge Spread FX = USD Since Hedge Spread FX is USD and is different than Spread FX, the system will settle the executed spread quantity in USD while everything else will be in GBP. Current spread is calculated as follows:

Current Spread=(($10.80/1.6637)*0.4)−(£1.2028*1.0)+£0;

Current Spread=£1.39

If Spread Limit greater than or equal to £1.39, the spread is in-line, and the system sends out
a VOD-Limit Order for 1200 at £1.2025, and
an AMR-Market Order for 480.
Assuming that the AMR order is filled at $10.80, the system settles in GBP as follows:
480*$10.80/$1.6637=£3115.9464 received for selling AMR.
Assuming that the VOD order is filled at £1.2028, the executed spread is £1.39. The system settles the executed spread in USD, as follows:
1200*£1.39*$1.6637=$2775.0516 received.

Figure 6:
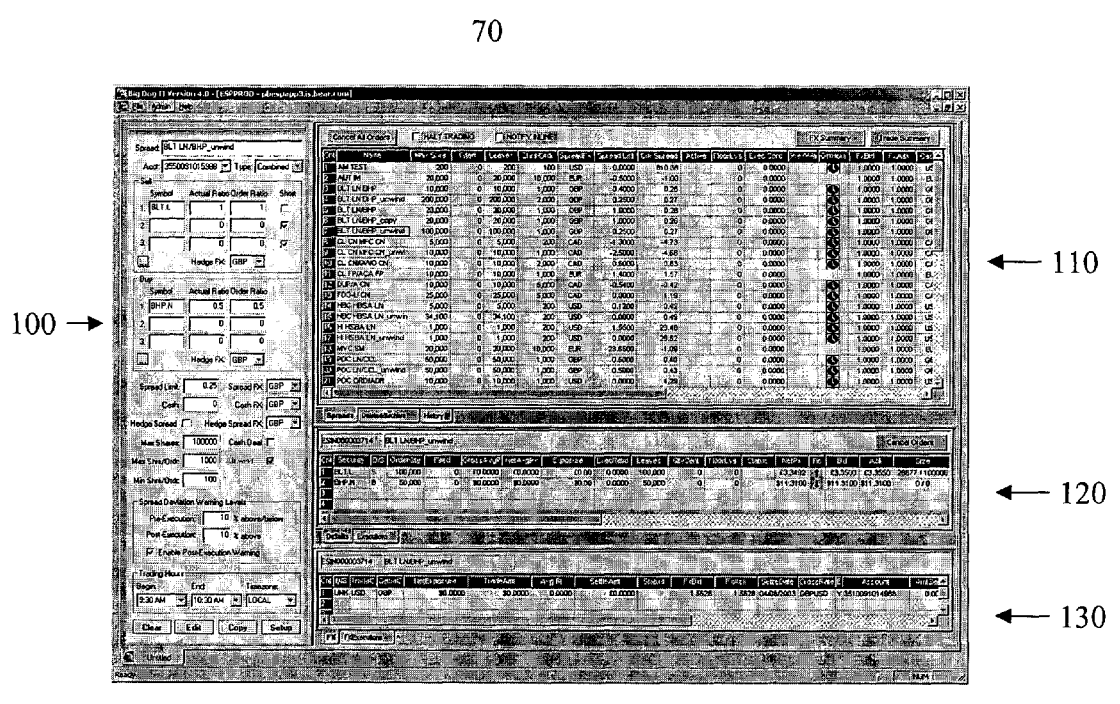
Figure 7:
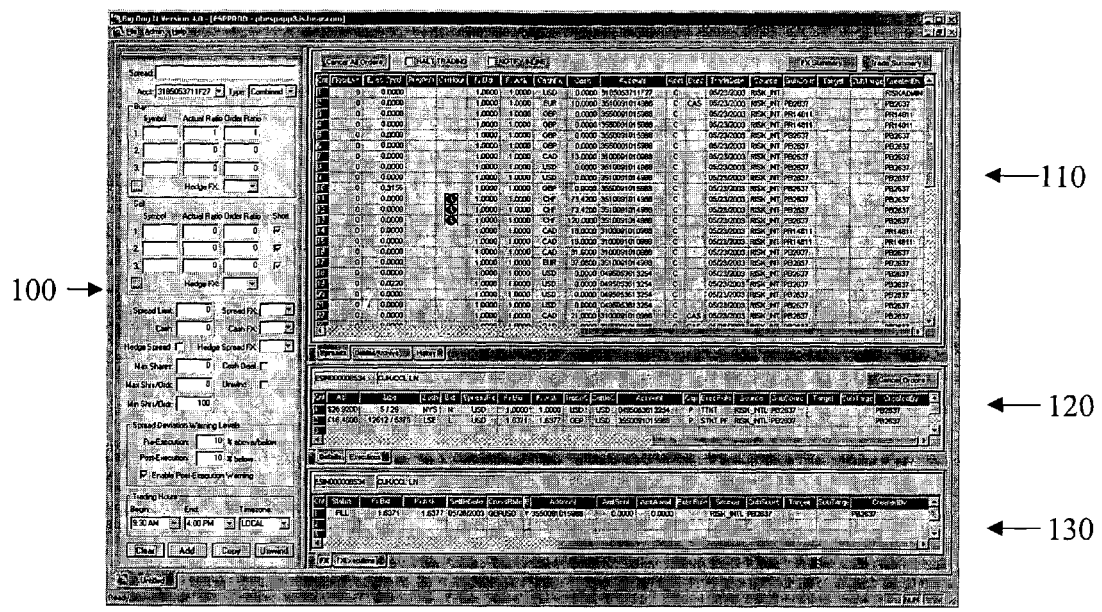

An exemplary graphical user interface for allowing a trader to interact with the client station 10 will now be described with reference to FIGS. 6-11. The main screen 70 of the graphical user interface, as shown in FIGS. 6 and 7, has four panels within that screen: the Spread Parameters Panel 100 allows a trader to enter and edit spread parameters within a specific spread. The All Spreads Panel 110 allows the trader to view all spreads in his or her account, including certain spread parameters, market parameters, and execution parameters, and to activate a spread, which will allows an order to be executed when certain market conditions exist for a spread. The Spread Execution Panel 120 allows the trader to view certain execution parameters relating to the order status for each of the securities that comprise a specific spread highlighted in the All Spreads Panel 110. The FX Panel 130 allows the trader to view the foreign exchange exposure relating to the securities that comprise a specific spread highlighted in the All Spreads Panel 110. Each of these panels will now be described in more detail.

The Spread Parameters Panel 100 allows the trader to perform various functions relating to spread entry, including: view all of the spread parameters for an existing spread; add a new spread; edit one or more of the trader's existing spreads; clear the parameters for a spread; copy an existing spread; and unwind an existing spread. The Spread Parameters Panel 100 displays the spread parameters for a spread line that is currently highlighted in the All Spreads Panel 110.

To add a new spread, the trader clicks "Add" and completes the following exemplary spread parameters on this panel: Spread Name; Account Number; Type of Account; Buy and Sell Side Information; Spread Limit; Cash Value; Share Quantity Information; Spread Deviation Warning Levels; and Trading Hours Information. These spread parameters will now be described in more detail:

The trader is required to enter a Spread Name, which is simply a moniker for identifying the spread. The Account Number and Account Type for each spread may be entered or will default to data stored in the spread database for the trader who is currently logged on to the system.

The Buy and Sell Information includes information identifying the buy and sell side securities. The trader is required to select Buy Securities by entering the symbol for each security that they wish to buy in the spread. The trader is then required to select Sell Securities by entering the symbol for each security that they wish to sell in the spread. The trader may choose to check a box entitled "Short" next to each sell entry which will tell the system to sell short the corresponding Sell Security. The trader may then enter an Actual Ratio for each Buy Security and Sell Security in the spread, which is the ratio at which to determine whether to initiate buy and sell orders for the securities in the spread. The trader may then enter an Order Ratio for each Buy Security and Sell Security in the spread, which is the ratio at which the trader would actually like to buy and sell shares of each security in the spread, when the spread is in-line. The trader may then enter the Hedge FX which determines the currency to which the trader wishes to convert the market data received for the buy and Sell Securities in the spread.

The trader is required to enter the Spread Limit, which is the minimum spread for which a current spread must be greater than or equal to execute a share order. The trader may then enter a Cash value, which is the cash amount received when the Sell Security is exchanged for the Buy Security at the time the securities are converted. The trader may then enter the Spread FX and the Cash FX, which determines the currency to which the trader wishes to convert the spread limit and cash. The trader may then choose to click on Hedge Spread to hedge against or offset the exposure to the local foreign currency and enter the Hedge Spread FX, which determines the foreign currency being offset.

The trader is required to enter share quantity (i.e., size) information, including the Maximum Number of Shares to be bought or sold for each security per day. The trader is also required to enter the Maximum Number of Shares Per Single Order to be bought or sold for each security. The trader is additionally required to enter the Minimum Number of Shares Per Single Order to be bought or sold for each security.

The trader may enter Pre-Execution Spread Deviation Warning Level (as a spread parameter), which is a percentage, or other indication (e.g., fixed amount), above or below the spread limit of an active spread that will initiate a passive warning. Zero means no warning. The trader may also enter a Post-Execution Spread Deviation Warning Level which is a percentage below the spread limit of an active spread that will initiate an active warning. Zero means no warning. Additionally, the trader may choose (as indicated as a spread parameter) whether to enable the Post-Execution Spread Deviation Warning for the specific spread by to checking a box entitled "Enable Post-Execution Warning." The warnings initially displayed will be global default warning levels set by an administrator. Warnings can be varied by the trader for each spread line that is created. If a spread deviates from these levels prior to execution, a yellow flag will be displayed next to the corresponding spread line in the All Spreads Panel 110. If the spread deviates from these levels post execution, a pop-up warning will display. Warnings will only display for active spreads.

The Trading Hours for which the trader is able to trade the selected securities in a market, along with the time zone in which the trader is present, is determined based on information stored in the spread database 24 for the particular securities selected by the trader.

To initiate the editing of an existing spread, the trader can click on the "Edit" button. The mode in the Spread Parameters Panel 100 switches from "read-only mode" to "edit mode" which allows the trader to edit the existing editable spread parameters set for the spread currently displayed in the Spread Parameters Panel 100. If the spread is active when the trader presses the "Edit" button, it automatically is changed to inactive. After edits are made, the trader click "Cancel" to revert to the original spread and quit the edit.

To clear all of the spread parameters that are currently for a spread in the Spread Parameters Panel 100, the trader can click on the "Clear" button.

To copy an existing spread as the basis for a new spread, the trader can click on the "Copy" button. When the trader selects "Copy", the editable spread parameters for the spread currently displayed in the Spread Parameters Panel 100 are populated with the spread parameters set for the spread highlighted in the All Spreads Panel 110, with the exception of the spread name, account, and type fields, which remain unchanged.

To initiate an Unwind of the selected spread, the trader can click on the "Unwind" button. If the trader clicks "Unwind" the Buy Securities and corresponding information are switched to sell entries and the Sell Securities and the corresponding information are switched to buy entries. The trader will have the option to save the unwound spread with a different name without effecting the original spread and its corresponding spread parameters.

After adding or revising the securities and spread parameters within the spread shown in the Spread Parameters Panel 100 the trader may click on a button to save the new spread or save the edits to the existing spread. The spread as added or revised in the Spread Parameters Panel 100 will be stored in the spread database 24.

The All Spreads Panel 110 allows the trader to: view the details for all existing spreads; delete/archive a spread; activate a spread; and deactivate a spread. The All Spreads Panel 110 displays all of the non-archived spreads in a trader's account as spread lines. A spread line is each spread name and certain corresponding data fields, including spread parameters, market parameters, and execution parameters. One spread line in the All Spreads Panel 110 can be selected at a time by clicking on a data field in the spread line. When a spread line is selected, the following occurs: the spread is highlighted; the Spread Parameters Panel 100 is populated with the spread parameters for the spread; and the Spread Execution Panel 120 and the FX Panel 130 is populated with certain spread parameters, market parameters, and execution parameters for the securities that comprise the spread.

The following data fields are displayed for each spread line: Name; Maximum Shares; Filled; Leaves; Shares Per Order; Spread FX; Spread Limit; Current Spread; Active; Floor Leaves; Executed Spread; Pre-Execution Warning Level; Off Hour; FX Bid; FX Ask; Cash FX; Cash; Account Number; Type of Account; Executed; Trade Date; Sell; Sub Sell; Buy; Sub Buy; and Created By.

The Name, Account Number, and Type of Account fields display the spread name, account number, and type of account as entered in the Spread Parameters Panel 100.

The maximum shares spread parameter displays the maximum number of shares to be bought or sold for the corresponding security per day as entered in the Spread Parameters Panel 100.

The Filled execution parameter displays the number of buy/sell shares in orders that have been filled for the corresponding security per day.

The Leaves execution parameter displays the number of buy/sell shares in orders that have not been filled for the corresponding security per day (i.e., Leaves=Total Shares in Orders Executed (this security)−Shares in Orders Filled (this security)).

The Shares Per spread parameter displays the maximum number of shares per single order to be bought or sold for the corresponding security as entered in the Spread Parameters Panel 100.

The Spread FX spread parameter displays the currency to which the trader wishes to convert the spread limit as entered in the Spread Parameters Panel 100.

The Spread Limit spread parameter displays the minimum spread for which a current spread must be greater than or equal to execute an order as entered in the Spread Parameters Panel 100.

The Current Spread market parameter displays the current spread value as described in connection with FIGS. 3 and 5, based on current data from the market data feeds 40.

If the spread is in-line, the font color of the current spread parameter is green. If the spread is not in-line, the font color of the current spread parameter is black. If one or more of the securities in the spread has an invalid price, such as when the real-time price cannot be accessed, the font color of the current spread parameter is red.

The Active spread parameter displays whether a spread line is currently active.

The Floor Leaves execution parameter displays the total number of shares in orders that were executed, but not yet filled or rejected (for all securities in the corresponding spread) (i.e., Floor Leaves=Total Shares in Orders Executed−(Total Shares Filled+Total Shares Rejected)).

The Executed Spread execution parameter displays the spread amount at which the share orders for the securities were executed, according to the following.

Weighted Average Sell Price=Sum of (Avg. Price*Executed Ratio) for all Sell Securities;

Weighted Average Buy Price=Sum of (Avg. Price*Executed Ratio) for all Buy Securities;

Executed Spread for Normal Spread=Weighted Average Sell Price−Weighted Average Buy Price; and Executed Spread for Unwind=Weighted Average Buy Price−Weighted Average Sell Price.

The Pre-Execution Warning Level spread parameter displays the percentage above or below the spread limit of an active spread that will initiate a passive warning as entered in the Spread Parameters Panel 100.

The Off Hour market parameter indicates that the current time is not within the trading hours set up for the spread in the Spread Parameters Panel 100.

The FX Bid market parameter displays the current bid price being offered by FX Trader (e.g., the indicative or other rate from the FX market data feed 44) for the particular currency. Similarly, the FX Ask market parameter displays the current offer price being offered by FX Trader for the particular security.

The Cash FX spread parameter displays the currency to which the trader wishes to convert the cash value as entered in the Spread Parameters Panel 100.

The Cash spread parameter displays the cash amount received when the Sell Security is exchanged for the Buy Security at the time the securities are converted.

The Executed execution parameter displays the total shares executed for all securities in the spread, which is the sum of all buy shares and sell shares that were executed.

The Trade Date execution parameter displays the date on which the securities in the spread were traded.

The Sell execution parameter displays information relating to the internal trading desk that conducted a trade involving securities in the spread.

The Sub Sell execution parameter displays information relating to the particular trader who conducted a trade involving securities in the spread.

The Buy execution parameter displays the external market in which a trade involving securities in the spread was filled.

The Sub-Buy execution parameter displays more specific information relating to the external market in which a trade involving securities in the spread was filled.

The Created By execution parameter displays the identifier of the particular client station 10 at which the trade involving the securities in the spread was conducted.

The trader can delete a spread by highlighting the spread and then clicking on the "Delete" button. Each time a trader deletes a spread, the spread engine 20 removes the deleted spread from the spread database 24 and stored the spread in the archive database 26. A trader can view his or her archived spreads by clicking on the "Deleted/Archived" button in the All Spreads Panel 110.

If a trader wants to activate a spread, the trader simply clicks on the "Active" column in the corresponding spread line row. When a spread is active, a bullet icon is displayed in the "Active" column. When a spread is inactive, no icon is displayed in the "Active" column.

The Spread Execution Panel 120 allows the trader to: view fields relating to the order execution status for each of the securities that comprise a specific spread selected in the All Spreads Panel 110.

When the trader selects a spread line in the All Spreads Panel 110, the following data fields are displayed in the Spread Execution Panel 120 for each security in the selected spread: Security Buy/Sell; Order Quantity; Filled; Gross Average Price; Net Average Price; Exposure; Execution Ratio; Leaves; Quantity Sent; Floor Leaves; Status; Net Price; Tick Indicator; Bid; Ask; Size; Exchange; Ext; Spread FX; FX Bid; FX Ask; Trade Currency; Settle Currency Account; Cap; Executed Rule; Sell; Sub Sell; Buy; Sub Buy; and Created By.

The Security spread parameter displays the name of a security in the spread as entered in the Spread Parameters Panel 100.

The Buy/Sell spread parameter displays whether the security is a Buy Security, a Sell Security, or a sell short security as entered in the Spread Parameters Panel 100.

The Order Quantity spread parameter displays the maximum number of shares to be bought or sold for the corresponding security per day as entered in the Spread Parameters Panel 100.

The Filled execution parameter displays the number of buy/sell orders that have been filled for the corresponding security per day.

The Gross Average Price execution parameter displays the average price at which the buy/sell orders for the corresponding security were filled.

The Net Average Price execution parameter displays the average price at which the buy/sell orders for the corresponding security were filled, minus any commissions, taxes, etc. (i.e., Order Price=Shares Filled (this security)*Execution Price (per share); Net Average Price=Sum of all Order Prices/Shares Filled (this security)).

The Exposure execution parameter is a measure of the total foreign exchange exposure of the trader in the corresponding currency.

The Execution Ratio execution parameter displays the ratio at which the buy/sell orders for the corresponding security were executed (i.e., Execution Ratio=(Shares Executed (this security)*Buy #1 Ratio)/Shares Executed of Buy #1).

The Leaves execution parameter displays the number of buy/sell orders that have not been filled for the corresponding security per day (i.e., Leaves=Quantity Sent (this security)−Shares Actually Filled (this security)).

The Quantity Sent execution parameter displays the total number of shares for each security that were sent.

The Floor Leaves execution parameter displays the total number of share orders for each security that were sent, but not yet filled or rejected (i.e., Floor Leaves=Total Shares Orders Executed−(Total Shares Filled+Total Shares Rejected)).

The Status execution parameter displays the status of an order that has been executed. For example, the status "Part" represents that the order is partially filled and there are floor leaves. When the order has been filled, the status will change to "Fill".

The Net Price market parameter displays the current bid/ask price for the security, minus commission, taxes, etc.

The Tick Indicator execution parameter generally displays the direction of the last sale for the security. However, for OTC securities, the tick indicator represents the direction of the bid price.

The Bid market parameter displays the current bid price for the corresponding security received in real-time by the spread engine 20 from the market data feeds 40.

The Ask market parameter displays the current ask price for the corresponding security received in real-time by the spread engine 20 from the market data feeds 40.

The Size market parameter displays the current bid size and ask size.

The Exchange spread parameter displays the exchange that the security is traded on.

The Ext market parameter displays the Reuters extension that uniquely identifies the exchange that the security is traded on.

The Spread FX spread parameter displays the currency to which the trader wishes to convert the spread limit as entered in the Spread Parameters Panel 100.

The FX Bid market parameter displays the current Bid price being offered by FX Trader for the particular security.

The FX Ask market parameter displays the current Bid price being offered by FX Trader for the particular security.

The Trade Currency market parameter displays the normal currency for the security in the spread.

The Settle Currency market parameter displays the currency for which the trader wants the security in the spread to be converted.

The Account spread parameter displays the account number for the spread as entered in the Spread Parameters Panel 100.

The Cap execution parameter displays the party taking the risk in the trade, such as the agency or the principle.

The Executed Rule execution parameter displays the rules that were selected by the trader in determining when to execute a line order for securities in the spread.

The Sell execution parameter displays information relating to the internal trading desk that conducted a trade involving securities in the spread.

The Sub Sell execution parameter displays information relating to the particular trader who conducted a trade involving securities in the spread.

The Buy execution parameter displays the external market in which a trade involving securities in the spread was filled.

The Sub Buy execution parameter displays more specific information relating to the external market in which a trade involving securities in the spread was filled.

The Created By execution parameter displays the number of the client workstation at which the trade involving the securities in the spread was conducted.

The FX Panel 130 allows the trader to view information relating to the trader's foreign exchange exposure in the securities of a spread. When the trader selects a spread line in the All Spreads Panel 110, the following data fields are displayed in the FX Panel 130 for each security in the selected spread: Buy/Sell; Trade Currency; Settle Currency; Net Exposure; Trade Amount; Average; Settle Amount; Status; FX Bid; FX Ask; Settle Date; Cross Rate; Enabled; Account; Amount Sent; Amount Await; Executed Rule; Sell; Sub Sell; Buy; Sub Buy; and Created By.

The Buy/Sell spread parameter displays whether the security is a Buy Security, a Sell Security, or a sell short security as entered in the Spread Parameters Panel 100.

The Trade Currency market parameter displays the normal currency for the security in the spread.

The Settle Currency market parameter displays the currency for which the trader wants the security in the spread to be converted.

The Net Foreign Exposure execution parameter displays the net foreign exchange exposure of the trader in the corresponding security.

The Trade Amount execution parameter displays the amount of a currency involved in the trade for the corresponding security.

The Average market parameter displays the average exchange rate between the currency in the Trade Amount and the currency in the Settle Amount.

The Settle Amount execution parameter displays the amount of a currency equivalent to Trade Amount that trader desires at current exchange rate.

The Status execution parameter displays the status of an order that has been executed. For example, the status "Part" represents that the order is partially filled and there are floor leaves. When the order has been filled, the status will change to "Fill".

The FX Bid market parameter displays the current Bid price being offered by FX Trader for the particular security.

The FX Ask market parameter displays the current Bid price being offered by FX Trader for the particular security.

The Settle Date market parameter displays the date by which the purchase price of the security must be transferred to the seller.

The Cross Rate market parameter displays the various currencies for each security in the spread.

The Enabled parameter displays whether the provider supports the transaction for the corresponding security internally the Account spread parameter displays the account number for the spread as entered in the Spread Parameters Panel 100.

The Amount Sent execution parameter displays the total number of share orders for each security that were sent to be filled. The Amount Await execution parameter displays the total number of share orders for each security that were sent, but not yet filled or rejected.

The Executed Rule parameter displays the rules that were selected by the trader in determining when to execute a line order for securities in the spread.

The Sell execution parameter displays information relating to the internal trading desk that conducted a trade involving securities in the spread.

The Sub Sell execution parameter displays information relating to the particular trader who conducted a trade involving securities in the spread.

The Buy execution parameter displays the external market in which a trade involving securities in the spread was filled.

The Sub Buy execution parameter displays more specific information relating to the external market in which a trade involving securities in the spread was filled.

The Created By parameter displays the number of the client workstation at which the trade involving the securities in the spread was conducted.

Figures 8, 9:
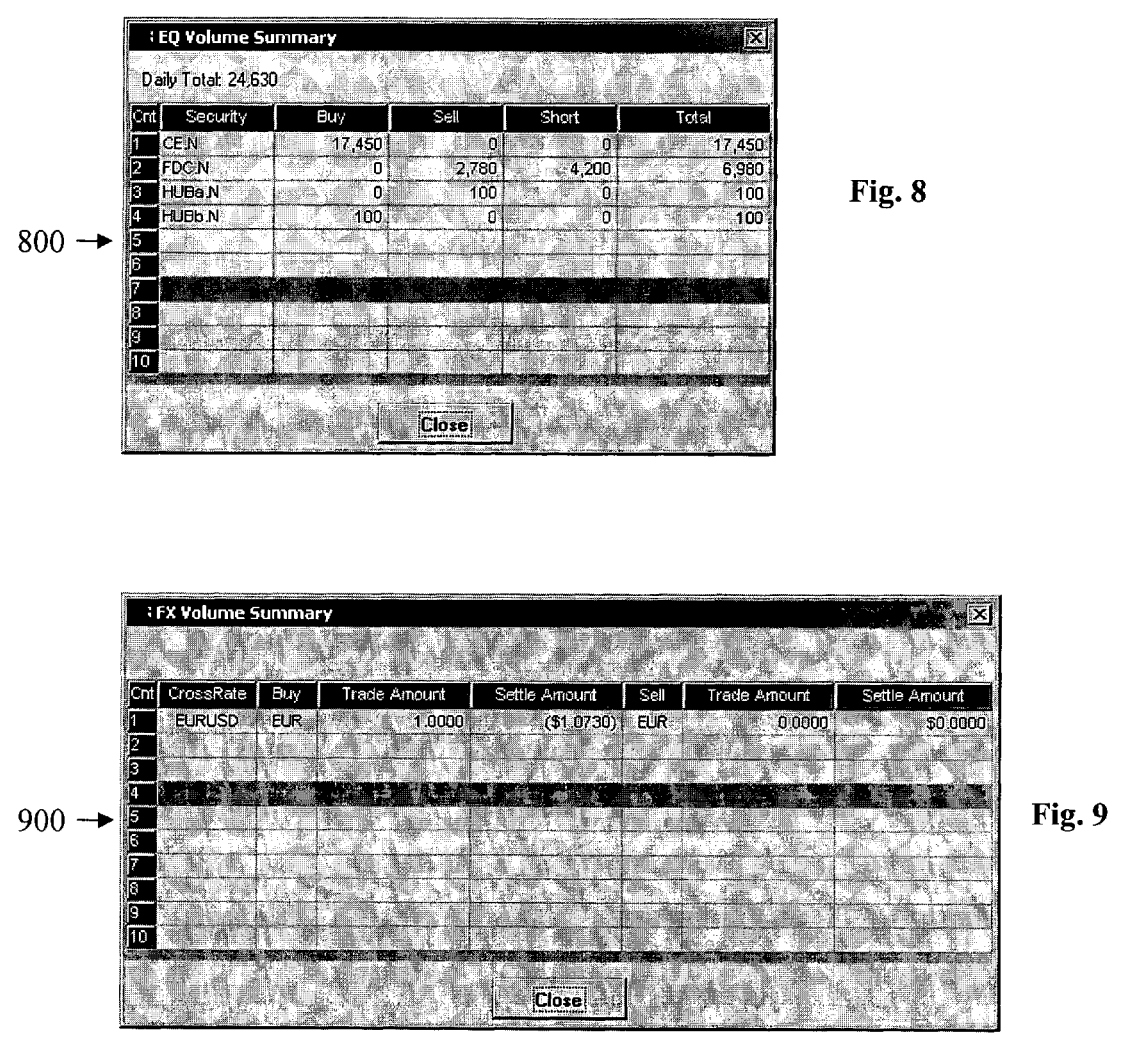

The Trade Summary Dialog Panel 800, shown in FIG. 8, allows the trader to view the daily number of shares traded for each security and the daily total number of shares traded for all securities. The following data fields are displayed in the Trade Summary Dialog Panel 800 for each security that has been traded during that day:

The Security execution parameter displays the name of a security that has been traded during the day.

The Buy execution parameter displays the total number of shares bought for the corresponding security during that day.

The Sell execution parameter displays the total number of shares sold for the corresponding security during that day.

The Short execution parameter displays the total number of shares sold short for the corresponding security during that day.

The Total execution parameter displays the total number of shares traded (bought+sold+sold short) for the corresponding security during that day.

The Daily Total execution parameter displays the sum of the total number of shares traded for each security during that day.

Additionally, the trader may click on an Equity Trade Summary Dialog Panel 800, shown in FIG. 8, which allows a trader to view the daily number of shares traded for each security and the daily total number of shares traded for all securities.

Additionally, the trader may click on an FX Trade Summary Dialog Panel 900, shown in FIG. 9, which allows a trader, using FX Trader, to view the foreign exchange transactions for a period of time.

Figure 10:
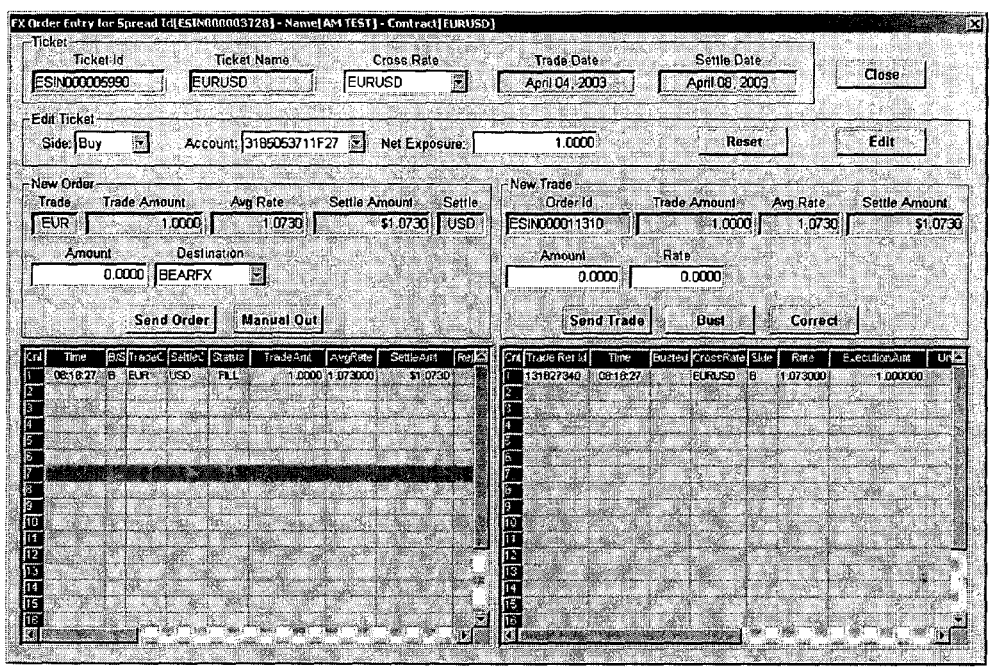
Figure 11:
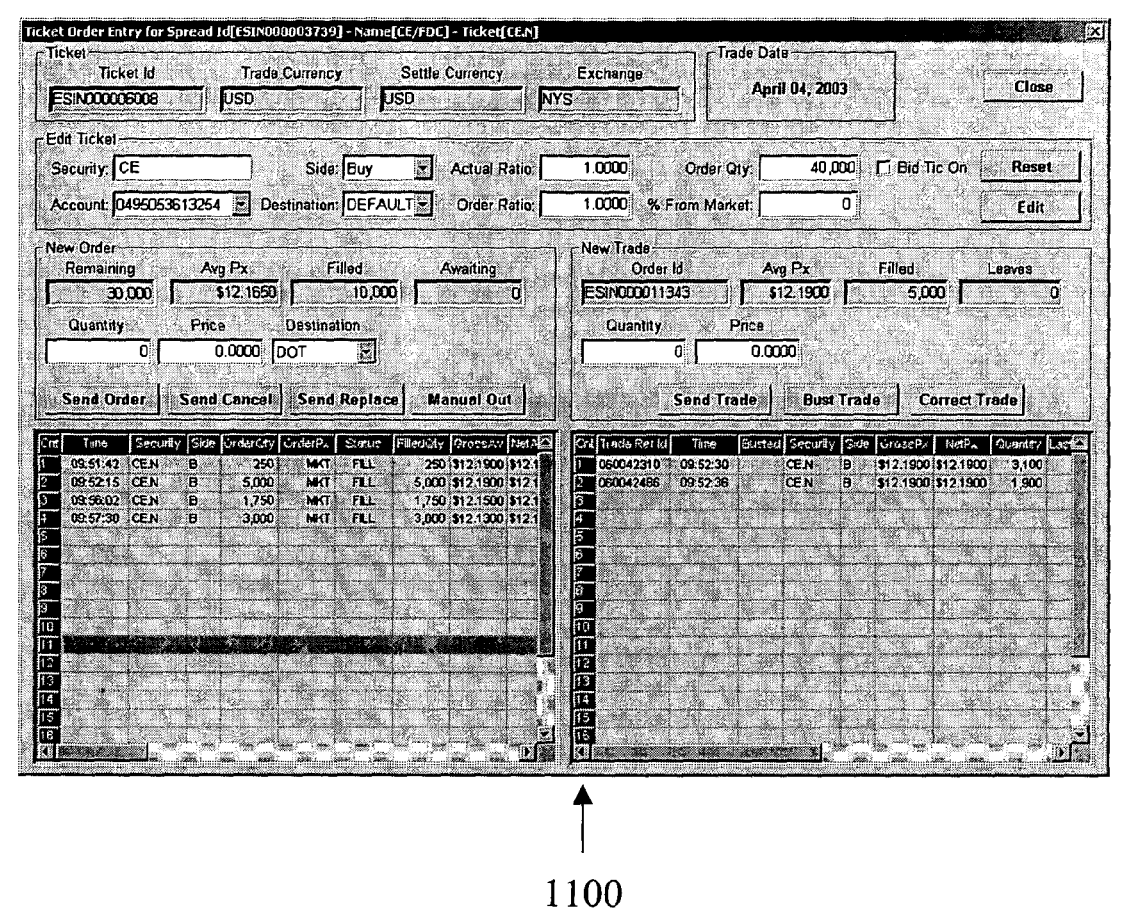

The trader may also click on a Single Order Dialog Panel 1000, shown in FIG. 10, and an FX Single Order Dialog Panel 1100, shown in FIG. 11, which allow the trader to enter single orders (buy, sell, short sell) for any security as well as orders that use FX Trader functionality and allow the trader to leg into trades on their own or hedge small amounts of shares or monies that might not have been executed due to rounding adjustments or rejects during the trading day. These panels also allow the trader to view certain spread parameters, market parameters, and execution parameters, relating to an individual spread, such as trades executed, time executed, market and size at the time of execution, tick direction, and the like Those skilled in the art will recognize that the method and system of the present invention has many applications, may be implemented in many manners and, as such, is not to be limited by the foregoing exemplary embodiments and examples. Additionally, the functionality of the components of the foregoing embodiments may be implemented in different manners.

In this regard, it is to be understood that anything that can be entered by the trader could instead be predetermined by the system or system administrator. Additionally, the order execution server could be an order execution engine, for example, taking the form of a software application, routine or object, residing on the same or different hardware as the spread engine, such as the client station or a central server. Further, it is to be understood that the steps in the foregoing embodiments may be performed in any suitable order, combined into fewer steps or divided into more steps. For example, the rule checks may be performed in a different order, and application of the rules and rule checks may be combined into a single process or step. Additionally, the execution parameters of the orders, such as order size and price, may be adjusted during various steps of the process. Thus, the scope of the present invention covers conventionally known and future developed variations and modifications to the system components and processes described herein, as would be understood by those skilled in the art.

What is claimed is:

1. A system for initiating trading of a spread of two or more securities in two or more markets, the system comprising: (i) a computer-based client station; (ii) a processor; (iii) an order execution server; and (iv) a spread database, wherein
   (i) the computer-based client station is coupled to the processor and is configured to:
      (a) transmit information relating to the spread to a spread engine; and
      (b) display information relating to the spread received from the spread engine;
   (ii) the processor is running the spread engine and is coupled to the computer-based client station, the order execution server, the spread database, and at least one market data feed, wherein the spread engine is configured to:
      (c) identify spread parameters pertaining to the securities received from the computer-based client station;
      (d) receive market data relating to the two or more securities of the spread received from the market data feed; and
      (e) determine that the market data falls within certain spread parameters; and
      (f) transmit orders to the order execution server;
   (iii) the order execution server is coupled to the processor, the spread database, at least one domestic external market and at least one foreign external market, and is configured to:
      (g) receive orders from the spread engine;
      (h) initiate a first order in at least one of the foreign external markets for a first security of the spread in a foreign currency;
      (i) initiate a second order in at least one of the domestic external markets for a second security of the spread, whereby the second order is at a selected ratio as compared to the first order to reduce the risk of adverse price movements in the first security;
      (j) initiate an FX Order to offset foreign exchange exposure resulting from the first order in the foreign external market; and
      (k) transmit execution data to the spread database; and wherein
   (iv) the spread database is coupled to the processor and the order execution server, and is configured to store information relating to the spread received from the order execution server and the spread engine;
wherein the spread engine is configured to initiate the first order through the order execution server only where the market data related to one or more securities in the spread pass one or more of the following rule checks:
   (1) for each Buy Security, the Ask Size must be>=Actual Ratio*Minimum Order;
   (2) for each Sell Security, the Bid Size must be>=Actual Ratio*Minimum Order; and
   (3) for each Sell Security that is checked Sell Short, the last/bid tick direction rule check requires there must be an Uptick.

2. The system of claim 1, wherein the first order is a limit order and the second order is a market order, and wherein the second order is initiated following confirmation of the first order.

3. The system of claim 1, wherein the spread engine is further configured to convert the market data related to one or more securities in the spread to a certain currency identified in the spread parameters for the spread.

4. The system of claim 1, wherein the spread engine is configured to initiate the first order through the order execution server only where the market data related to one or more securities in the spread pass at least one additional rule check.

5. A computer implemented method of initiating trading of a spread of two or more securities in two or more markets, the method comprising:
   (i) identifying, by a processor running a spread engine, spread parameters pertaining to a relationship between the securities received from input from a computer-based client station;

(ii) receiving, by the spread engine, market data relating to the two or more securities;
(iii) determining, by the spread engine, whether the market data falls within certain spread parameters; and
(iv) through an order execution server,
   (a) initiating, through an order execution server, in a foreign external market a first order for a first security of the spread in a foreign currency, when the market data falls within the certain spread parameters;
   (b) initiating, through the order execution server, in a domestic external market a second order for a second security of the spread, when the market data falls within the certain spread parameters, whereby the second order and first order are at a selected ratio to reduce the risk of adverse price movements in the first security; and
   (c) initiating, through the order execution server, an FX Order to offset foreign exchange exposure resulting from the first order in the foreign external market; and
   (d) displaying information relating to the spread on the computer-based client station;
wherein the first order is initiated only where the market data related to one or more securities in the spread pass one or more of the following rule checks:
(1) for each Buy Security, the Ask Size must be>=Actual Ratio*Minimum Order;
(2) for each Sell Security, the Bid Size must be>=Actual Ratio*Minimum Order; and
(3) for each Sell Security that is checked Sell Short, the last/bid tick direction rule check requires there must be an Uptick.

6. The method of claim 5, wherein the first order is a limit order and the second order is a market order, and wherein the initiating the second order step is performed following confirmation of the first order.

7. The method of claim 5, further comprising converting the market data related to one or more securities in a spread to a certain currency identified in the spread parameters for the spread.

8. The method of claim 5, further comprising initiating the first order only where the market data related to one or more securities in the spread pass at least one additional rule check.

9. A system for initiating trading, the system comprising: (i) a computer-based client station; (ii) a processor; (iii) an order execution server; and (iv) a spread database, wherein
   (i) the computer-based client station is coupled to the processor and is configured to:
      (a) transmit information relating to the spread to a spread; and
      (b) display information relating to the spread received from the processor;
   (ii) the processor is running a spread engine and is coupled to the computer-based client station, the order execution server, the spread database, and at least one market data feed, wherein the spread engine is configured to:
      (c) receive spread parameters pertaining to a relationship between two or more securities in a spread in one or more markets from the computer-based client station;
      (d) process market data relating to the two or more securities received from the market data feed; and
      (e) determine whether the market data falls within the spread parameters; and
      (f) transmit orders to the order execution server;
   (iii) the order execution server is coupled to the processor, the spread database, at least one domestic external market and at least one foreign external market and is configured to:
      (g) received orders from the processor;
      (h) initiate a first order in at least one of the foreign external markets for a first security of the spread in a foreign currency, when the market data falls within one or more of the spread parameters;
      (i) initiate a second order in at least one of the domestic external markets for a second security of the spread, when the market data falls within one or more of the spread parameters, whereby the second order and the first order are at a selected ratio to reduce the risk of adverse price movements in the first security; and
      (j) initiate an FX Order to offset foreign exchange exposure resulting from the first order in the foreign external market; and wherein
   (iv) the spread database is coupled to the processor and the order execution server, and is configured to store information relating to the spread received from the order execution server and the spread engine,
wherein the spread engine is configured to apply at least one of the following rule checks to determine whether to initiate the first order:
(1) for each Buy Security, the Ask Size must be>=Actual Ratio*Minimum Order;
(2) for each Sell Security, the Bid Size must be>=Actual Ratio*Minimum Order; and
(3) for each Sell Security that is checked Sell Short, the last/bid tick direction rule check requires there must be an Uptick.

10. The system of claim 9, wherein the first order is a limit order and the second order is a market order, and wherein the second order is initiated following confirmation of the first order.

11. The system of claim 9, wherein the spread engine is configured to convert the market data related to one or more securities in a spread to a certain currency identified in the spread parameters for the spread.

12. The system of claim 9, wherein the spread engine is configured to apply at least one additional rule check to determine whether to initiate the first order.

13. A client-server system for initiating trading involving two or more securities, the system comprising:
   a computer-based client station, wherein a trader inputs spread parameters pertaining to a relationship between two or more securities in two or more markets and transmits the spread parameters;
   a processor running a spread engine and in communication with the client station, the spread engine configured to receive the spread parameters from the computer-based client station, receive market data relating to the two or more securities from at least one market data feed, and determine whether the market data falls within the spread parameters; and
   a server in communication with the spread engine, at least one domestic external market and at least one foreign external market, the server configured to initiate two or more orders when the market data for the two or more securities falls within the spread parameters, wherein at least one of the two or more orders is in a foreign external market for a security in a foreign currency, and wherein the server is configured to initiate an FX Order to offset foreign exchange exposure resulting from initiation of the order for the security in the foreign currency;
wherein the spread engine is configured to initiate the first order only where the market data related to one or more securities in the spread pass one or more of the following rule checks:
(1) for each Buy Security, the Ask Size must be>=Actual Ratio*Minimum Order;
(2) for each Sell Security, the Bid Size must be>=Actual Ratio*Minimum Order; and (3) for each Sell Security that is checked Sell Short, the last/bid tick direction rule check requires there must be an Uptick.

14. The system of claim 13, wherein at least one of the two or more orders is a limit order and at least one of the two or more orders is a market order, and wherein the server initiates the one or more limit orders and then following confirmation of the one or more limit orders, initiates the one or more market orders.

15. The system of claim 13, wherein the spread engine is configured to convert the market data related to one or more securities in a spread to a certain currency identified in the spread parameters for the spread.

16. The system of claim 13, wherein the spread engine is configured to initiate the first order only where the market data related to one or more securities in the spread pass at least one additional rule check.

17. A system for initiating a trade spread of two or more securities in two or more markets, the system comprising: (i) a computer-based client station; (ii) a processor; and (iii) an order execution server, wherein
- (i) the computer-based client station is coupled to the processor and is configured to transmit and display information relating to the spread;
- (ii) the processor is running a spread engine and is coupled to the computer-based client station, the order execution server and at least one market data feed, wherein the spread engine is coded with one or more rule checks for determining whether to initiate a first order and is configured to:
  - identify spread parameters pertaining to the securities received from the computer-based client station;
  - receive market data relating to the two or more securities of the spread received from the market data feed;
  - determine whether the market data falls within certain spread parameters;
  - evaluate whether the rule checks are satisfied;
  - transmit orders to the order execution server; and
- (iii) the order execution server is coupled to the processor, at least one domestic external market and at least one foreign external market, and is configured to:
  - initiate a first order in at least one of the foreign external markets for a first security of the spread in a foreign currency;
  - initiate a second order in at least one of the domestic external markets for a second security of the spread, whereby the second order is at a selected ratio as compared to the first order to reduce the risk of adverse price movements in the first security; and
  - initiate an FX order to offset foreign exchange exposure resulting from the first order in the foreign external market, wherein the one or more rule checks comprises one or more of the following equations:
   (1) for each Buy Security, the Ask Size must be>=Actual Ratio*Minimum Order;
   (2) for each Sell Security, the Bid Size must be>=Actual Ratio*Minimum Order; and
   (3) for each Sell Security that is checked Sell Short, the last/bid tick direction rule check requires there must be an uptick.

18. The system of claim 17, wherein the one or more rule checks further comprises one or more of the following variables:
   bid/offer size; round lot; last/bid tick direction; markets(s) open; depth of market; and position limits.

* * * * *